(12) United States Patent
Tsuruma et al.

(10) Patent No.: US 8,411,232 B2
(45) Date of Patent: Apr. 2, 2013

(54) LIQUID CRYSTAL DISPLAY WITH A REDUCED FLEXOELECTRIC EFFECT

(75) Inventors: Takeyuki Tsuruma, Aichi (JP); Hironao Tanaka, Kanagawa (JP); Makoto Watanabe, Aichi (JP); Hidemasa Yamaguchi, Aichi (JP); Amane Higashi, Aichi (JP); Youbun Ito, Aichi (JP); Yusuke Goto, Aichi (JP)

(73) Assignee: Sony Corporation, Tokyo (JP)

( * ) Notice: Subject to any disclaimer, the term of this patent is extended or adjusted under 35 U.S.C. 154(b) by 238 days.

(21) Appl. No.: 13/021,458

(22) Filed: Feb. 4, 2011

(65) Prior Publication Data

US 2011/0211145 A1 Sep. 1, 2011

(30) Foreign Application Priority Data

Feb. 12, 2010 (JP) ................. P2010-029009
Feb. 16, 2010 (JP) ................. P2010-031434

(51) Int. Cl.
*G02F 1/1335* (2006.01)
*G02F 1/1343* (2006.01)
(52) U.S. Cl. ............... 349/106; 349/139; 349/110
(58) Field of Classification Search .......... 349/56, 349/110, 111, 128, 129, 139, 140, 141, 142, 349/143, 144, 147, 106
See application file for complete search history.

(56) References Cited

U.S. PATENT DOCUMENTS

| | | | |
|---|---|---|---|
| 6,038,006 A * | 3/2000 | Sasaki et al. .................. 349/106 |
| 6,069,678 A | 5/2000 | Sakamoto et al. | |
| 6,335,771 B1 * | 1/2002 | Hiraishi ........................ 349/42 |
| 6,600,541 B2 | 7/2003 | Kurahashi et al. | |
| 6,787,829 B2 | 9/2004 | Fukami et al. | |
| 7,697,093 B2 * | 4/2010 | Chan et al. ..................... 349/110 |
| 2004/0109122 A1 | 6/2004 | Kumagawa et al. | |
| 2009/0103035 A1 | 4/2009 | Suzuki et al. | |
| 2009/0180065 A1 * | 7/2009 | Chan et al. ..................... 349/110 |
| 2011/0211145 A1 * | 9/2011 | Tsuruma et al. ............... 349/106 |

FOREIGN PATENT DOCUMENTS

| | | |
|---|---|---|
| JP | 10-186407 | 7/1998 |
| JP | 2002-131767 | 5/2002 |
| JP | 2002-131780 | 5/2002 |
| JP | 3668844 | 4/2005 |
| JP | 2009-103925 | 5/2009 |
| JP | 2009-167228 | 7/2009 |

OTHER PUBLICATIONS

J.S. Patel and Sin-Dog Lee; Fast linear electro-optic effect based on cholesteric liquid crystals; J. Appl. Phys.; 66 (4); Aug. 15, 1989.

J.S. Patel and Robert B. Meyer; Flexoelectric Electro-optics of a Cholesteric Liquid Crystal; Physical Review Letters; vol. 58, No. 15, Apr. 13, 1987.

* cited by examiner

*Primary Examiner* — Brian Healy
(74) *Attorney, Agent, or Firm* — SNR Denton US LLP

(57) ABSTRACT

A liquid crystal display with a first substrate and a first pixel electrode on the first substrate. The first pixel electrode extends along first and second directions and has a plurality of first pixel electrode strips arranged along a first direction. The display also has a common electrode on the first substrate that is spaced from the pixel electrode along a third direction. In addition, the display has a light shield extending along the second direction and positioned to overlap at least part of an outermost strip of the first pixel electrode along the first direction.

11 Claims, 31 Drawing Sheets

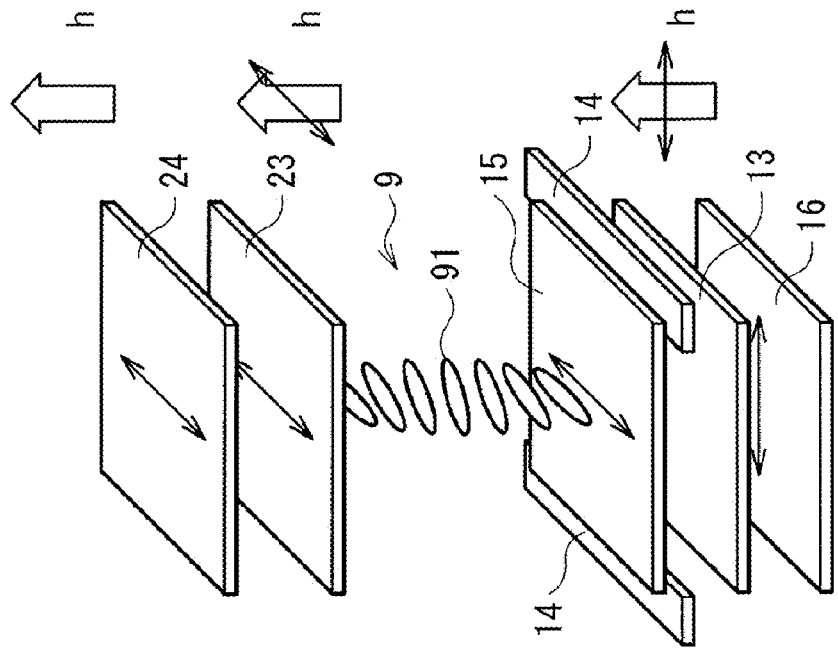
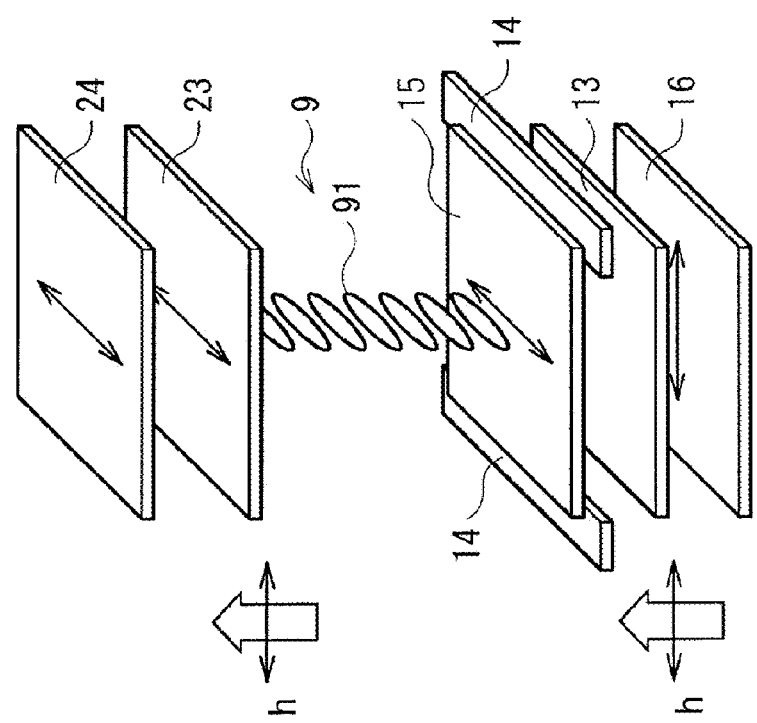

SMALL
TRANSMITTANCE
CHANGE

LARGE
TRANSMITTANCE
CHANGE

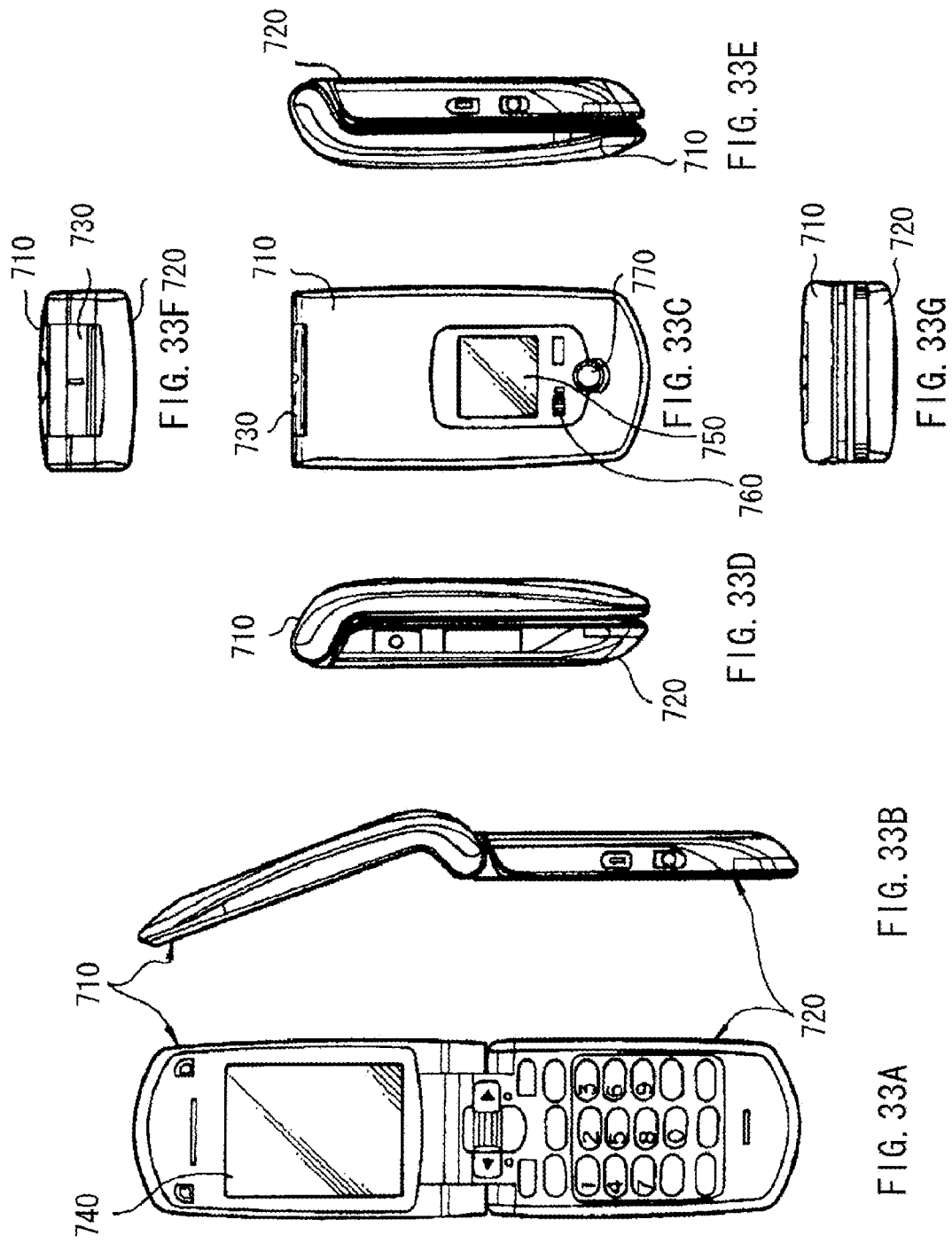

LIQUID CRYSTAL DISPLAY WITH A REDUCED FLEXOELECTRIC EFFECT

CROSS REFERENCES TO RELATED APPLICATIONS

This application claims priority to Japanese Patent Application JP 2010-029009 filed in the Japanese Patent Office on Feb. 12, 2010 and Japanese Patent Application JP 2010-031434 filed in the Japanese Patent Office on Feb. 16, 2010, the entire contents of both being incorporated herein by reference to the extent permitted by law.

BACKGROUND OF THE INVENTION

The present invention relates to a liquid crystal display driven by a lateral electric field drive mode and an electronic unit including the liquid crystal display.

In recent years, due to their low power consumption, space saving or the like, liquid crystal displays have become e mainstream displays. One of liquid crystal drive modes is a lateral electric field drive mode, such as an FFS (Fringe Field Switching) mode or an IPS (In-Plane Switching) mode. The lateral electric field drive mode is a drive mode for achieving display by forming an electric field in a direction parallel to a substrate and rotating liquid crystal molecules having a dipole moment in a plane parallel to the substrate. In particular, because the FFS mode has a simple electrode configuration in each pixel, the FFS mode is often used.

In the lateral electric field drive mode, a voltage is applied to each pixel electrode and a common electrode to form an electric field in a direction parallel to a substrate. When liquid crystal molecules are aligned in the direction of the electric field during voltage application, alignment deformation such as a so-called splay deformation or bend deformation occurs.

Liquid crystal molecules generally have shape asymmetry as illustrated in FIGS. 34A, 34B, 35A and 35B in addition to the dipole moment. When alignment deformation such as splay deformation or bend deformation occurs in a liquid crystal configured of such liquid crystal molecules, polarization may be induced. In other words, in a liquid crystal (a nematic medium), in the case where alignment deformation does not occur, as illustrated in FIG. 34A or FIG. 35A, polarization as a whole does not occur. On the other hand, when splay deformation occurs in a liquid crystal, as illustrated in FIG. 34B for example, polarization is induced, and when bend deformation occurs in a liquid crystal, as illustrated in FIG. 35B for example, polarization is induced. Such a phenomenon is known as a flexoelectric effect as described in J. S. Patel and Robert B. Meyer, "Flexoelectric electro-optics of a cholesteric liquid crystal", Physical Review Letters, Volume 58, pp. 1538-1540, 1987, J. S. Patel and Sin-Doo Lee, "Fast linear electro-optic effect based on cholesteric liquid crystals", Journal of Applied Physics, Volume 66, pp. 1879-1881, 1989, and the like.

In a liquid crystal display, to prevent degradation in a liquid crystal material, a so-called AC drive (or a frame reverse drive) is typically performed. In the AC drive, the polarity of a potential difference between the voltage of a pixel electrode and the voltage of a common electrode is reversed at regular intervals. In the case where a liquid crystal having the above-described flexoelectric effect is used for such a liquid crystal display, even if the polarity of the above-described potential difference is reversed in the AC drive, the polarity of polarization of the liquid crystal caused by the above-described flexoelectric effect is not simply reversed. As a result, light transmittance differs from pixel to pixel depending on the polarity of the potential difference. In particular, in the case where the AC drive is performed on such liquid crystal so as to reverse the polarity of a potential difference in each frame, light transmittance is different between a first frame (a positive frame), in which the voltage of the pixel electrode is larger than the voltage of the common electrode and a second frame (a negative frame), in which the voltage of the pixel electrode is smaller than the voltage of the common electrode. Accordingly, luminance of the liquid crystal display varies from frame to frame, and flickers occur on a screen to cause a decline in image quality.

A large number of methods of preventing the influence of a flexoelectric effect on image quality have been considered. For example, Japanese Patent No. 3668844 proposes a liquid crystal display configured by dividing each pixel into two regions in an IPS mode, and arranging a pixel electrode and a common electrode in one of the regions and a pixel electrode and a common electrode in the other region in interchanged positions so that electric field directions in the two regions are opposite to each other. Such a configuration prevents the occurrence of a difference in light transmittance in a pixel between a positive frame and a negative frame.

Moreover, a large number of methods for reducing the chances of causing a flexoelectric effect have been considered. For example, Japanese Unexamined Patent Application Publication No. 2009-167228 proposes a liquid crystal display using a liquid crystal having a less asymmetric molecular structure. Liquid crystal molecules are designed to have a structure in which the asymmetry is reduced in directions of an electron withdrawing group and an electron donating group.

In some liquid crystal displays, for example, as described in Japanese Unexamined Patent Application Publication Nos. 2002-131767, 2002-131780, H10-186407 and 2009-103925, a light-shielding layer is provided in a part of a pixel. The light-shielding layer is provided in an IPS mode to shield light in a part of a pixel where liquid crystal molecules are misaligned due to production of an unintended electric field between a pixel electrode and a pixel signal line. In other words, light in a part of a pixel where the alignment of liquid crystal molecules is not sufficiently controlled due to a pixel signal is shielded so as to prevent that part from affecting display. However, in the liquid crystal display disclosed in Japanese Patent No. 3668844, the electrode configuration in each pixel is complicated. In the liquid crystal display disclosed in Japanese Unexamined Patent Application Publication No. 2009-167228, because the molecular structure of the liquid crystal is complicated, material cost may increase, or the viscosity or birefringence of the liquid crystal may decrease. Further, in the case where various specifications are to be met, it is necessary to make a molecular design such as to obtain a molecular structure satisfying the specifications, and development cost may be expensive.

In Japanese Unexamined Patent Application Publication Nos. 2002-131767, 2002-131780, H10-186407 and 2009-103925, methods of preventing a decline in image quality caused by a pixel signal in an IPS mode liquid crystal display are disclosed, but a flexoelectric effect is not described therein. Therefore, a specific method of preventing a decline in image quality caused by a flexoelectric effect is not disclosed.

Therefore, it is desirable to provide a liquid crystal display and an electronic unit achieving high image quality with a simple configuration, without complicating an electrode configuration or a molecular structure of a liquid crystal.

SUMMARY OF THE INVENTION

The present invention recognizes that in a liquid crystal display, an alignment deformation, such as splay deformation or bend deformation, may occur in an outermost strip of a pixel electrode to induce polarization due to a flexoelectric effect. When a voltage is applied to both pixel electrodes and a common electrode to form an electric field in a direction parallel to the substrates, typically, in a region of an outermost strip of a pixel electrode, alignment deformation such as splay deformation or bend deformation occurs, and polarization may be induced by a flexoelectric effect. Therefore, when the polarity of a potential difference between the voltage of the pixel electrode and the voltage of the common electrode in an AC drive is reversed, light transmittance in a corresponding liquid crystal part differs depending on the polarity of the potential difference.

To address this problem, in one embodiment of the present invention, a liquid crystal display having a light shield is provided. The light shield prevents rays from passing through the corresponding liquid crystal part. As a result, a difference in light transmittance in a pixel between a positive frame and a negative frame is not produced, and flickers in a screen are reduced.

More particularly, according to this embodiment, the liquid crystal display comprises (i) a first substrate and (ii) a first pixel electrode on the first substrate. The first pixel electrode extends along first and second directions and has a plurality of first pixel electrode strips arranged along a first direction. The liquid crystal display further comprises (iii) a common electrode on the first substrate, where the common electrode is spaced from the pixel electrode along a third direction, and a light shield spaced from the pixel electrode and the common electrode. The light shield extends along the second direction and is positioned to overlap at least part of an outermost strip of the first pixel electrode along the first direction.

In the liquid crystal display according to the above-described embodiment, the light shield is positioned to overlap a part of the outermost strip of each pixel electrode or each entire pixel electrode; Accordingly, light having passed through a region having a flexoelectric effect is effectively prevented from adversely affecting the display, and high image quality is achievable with a simple configuration.

According to another embodiment of the present invention, a liquid crystal display comprising a dummy electrode may be provided. In particular, the liquid crystal display comprises (i) a first substrate, (ii) a first pixel electrode on the first substrate, the first pixel electrode extending along first and second directions and having a plurality of first pixel electrode strips arranged along a first direction, and (iii) a second pixel electrode on the first substrate. The second pixel electrode extends along first and second directions and has a plurality of second pixel electrode strips arranged along the first direction. The second pixel electrode is spaced from the first pixel electrode along the first direction. Further, the liquid crystal display comprises (iv) a common electrode on the first substrate and spaced from the first and second pixel electrodes along a third direction, and (v) a dummy electrode arranged between the first pixel electrode and the second pixel electrode.

According to this embodiment, the dummy electrode is formed in a region between pixels (inter-pixel region) so as to reduce a flexoelectric effect. In particular, the dummy electrode is arranged in the inter-pixel region so that a flexoelectric effect is less likely to occur, and high image quality is achievable with a simple configuration.

In other embodiments, the width of the inter-pixel region may be narrowed so as to reduce a flexoelectric effect. As a result, polarization of a liquid crystal caused by a flexoelectric effect is less likely to occur, and light blinking caused by a change in transmittance is prevented, and flickers in a screen are reduced. Further, flexoelectric effect is less likely to occur, and high image quality is achievable with a simple configuration.

According to one such embodiment of the present invention, a liquid crystal display comprises (i) a first substrate, (ii) a first pixel electrode on the first substrate, the first pixel electrode extending along first and second directions and having a plurality of first pixel electrode strips arranged along the first direction, where the plurality of first pixel electrode strips are distanced from each other along the first direction by a first interval, (iii) a second pixel electrode adjacent to the first pixel electrode, the second pixel electrode extending along first and second directions and having a plurality of second pixel electrode strips arranged along the first direction, where the plurality of second pixel electrode strips distanced from each other along the first direction by the first interval, and (iv) a common electrode on the first substrate and spaced from the first and second pixel electrodes in a third direction. Further, the first pixel electrode and the second pixel electrode are spaced from each other by a second interval that is effectively equal to the first interval.

In a related embodiment, a liquid crystal display comprises (i) a first pixel electrode extending along first and second directions, (ii) a second pixel electrode spaced from the first pixel electrode along the first direction by an interval, and (iii) a common electrode spaced from the first and second pixel electrodes along a third direction. Further, the interval between the first pixel electrode and the second pixel electrode is such that a flexoelectric effect in the liquid crystal display is reduced.

Those and other objects, features and advantages of the invention will become more apparent from the following description and drawings.

BRIEF DESCRIPTION OF THE DRAWINGS

FIGS. 6A and 6B are enlarged perspective views of a main part of the display section illustrated in FIG. 1.

FIGS. 33A to 33G illustrate Application Example 5 where FIGS. 33A and 33B are a front view and a side view in a state in which Application Example 5 is opened, respectively, and FIGS. 33C, 33D, 33E, 33F and 33G are a front view, a left side view, a right side view, a top view and a bottom view in a state in which Application Example 5 is closed, respectively.

DETAILED DESCRIPTION OF THE PREFERRED EMBODIMENTS

Preferred embodiments of the invention will be described in detail below referring to the accompanying drawings.

1. First Embodiment a. Configuration Example

Figure 1:
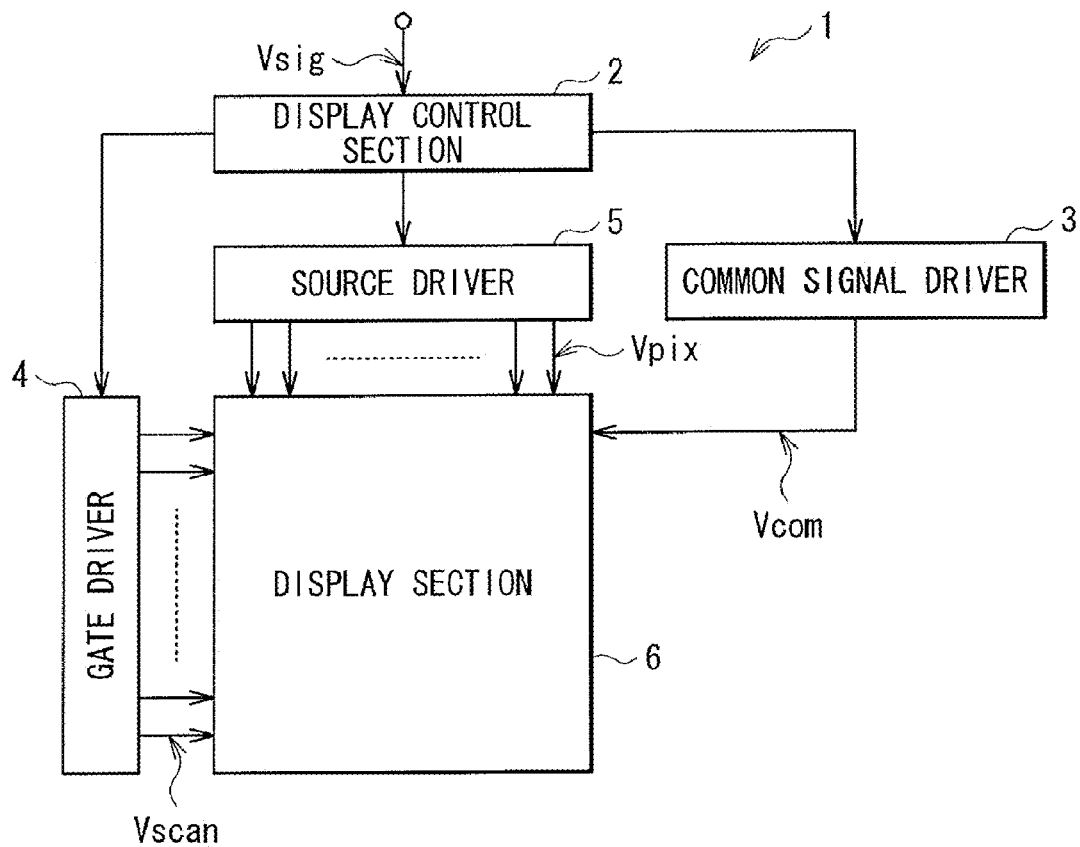
FIG. 1 is a block diagram illustrating an example of a liquid crystal display according to a first embodiment.

FIG. 1 illustrates an example of a liquid crystal display according to a first embodiment. A liquid crystal display 1 is an FFS mode liquid crystal display which prevents light from passing through a part of a pixel electrode corresponding to a part prone to cause a flexoelectric effect. The liquid crystal display 1 includes a display control section 2, a common signal driver 3, a gate driver 4 and a source driver 5.

The display control section 2 stores and maintains a supplied image signal Vsig for each screen (for display of each frame) in a frame memory configured of an SRAM (Static Random Access Memory) or the like. Moreover, the display control section 2 has a function of controlling the common signal driver 3, the gate driver 4 and the source driver 5 which drive a display section 6 to operate in conjunction with one another. More specifically, the display control section 2 supplies a common signal timing control signal and a scanning timing control signal to the common signal driver 3 and the gate driver 4, respectively, and supplies image signals for one horizontal line based on the image signal maintained in the frame memory and a display timing control signal to the source driver 5.

The common signal driver 3 is a circuit supplying a common signal Vcom to the display section 6 in response to the common signal timing control signal supplied from the display control section 2. In this example, the display section 6 operates by a frame reverse drive. In other words, the common signal driver 3 reverses the polarity of the common signal Vcom every frame to be displayed on the display section 6, and outputs the common signal Vcom.

The gate driver 4 has a function of selecting a pixel Pix to be driven for display (which will be described later) in the display section 6 in response to the scanning timing control signal supplied from the display control section 2. More specifically, the gate driver 4 selects, as pixels to be driven for display, pixels Pix, configuring one line from a matrix configured of pixels Pix by applying a scanning signal Vscan to gates (which will be described later) of transistors Tr of the pixels Pix through a scanning signal line GCL. Then, the selected pixels Pix perform display of one horizontal line in response to a pixel signal Vpix (which will be described later) supplied from the source driver 5. Thus, the gate driver 4 performs sequential scanning from one horizontal line to another in a time divisional manner, and operates so that display is performed on a whole display surface of the display section 6.

The source driver 5 is a circuit supplying image signals for one horizontal line supplied from the display control section 2 to each pixel Pix in the display section 6 as pixel signals Vpix. More specifically, the source driver 5 supplies the pixel signals Vpix to the pixels Pix, configuring one horizontal line selected by the gate driver 4 through a pixel signal line SGL.

The display section 6 displays an image based on the pixel signals Vpix supplied from the source driver 5. An example of the display section 6 will be described referring to FIGS. 2 to 6A and 6B.

Figure 2:
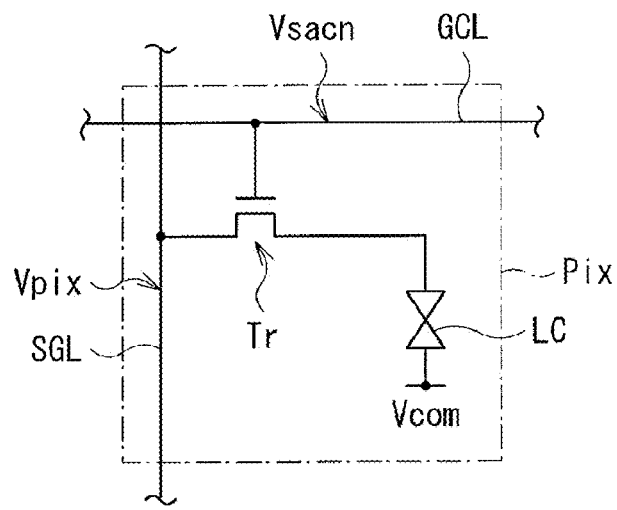
FIG. 2 is a circuit diagram illustrating an example of a display section illustrated in FIG. 1.

FIG. 2 illustrates an example of a circuit configuration of a pixel of the display section 6. The display section 6 includes a plurality of pixels Pix arranged in a matrix form. As illustrated in FIG. 2, each pixel Pix includes a transistor Tr and a liquid crystal element LC. The transistor Tr includes, for example, a thin film transistor (TFT) and, in this example, may be an n-channel MOS (Metal Oxide Semiconductor) type TFT. In the transistor Tr, a source is connected to the pixel signal line SGL, and a gate is connected to the scanning signal line GCL, and a drain is connected to the liquid crystal element LC through a pixel electrode 14 (not illustrated). One end of the liquid crystal element LC is connected to the drain of the transistor Tr through the pixel electrode 14 (not illustrated), and the other end of the liquid crystal element LC is connected to a common electrode 13 (not illustrated), so that the common signal Vcom is supplied to the liquid crystal element LC by the common signal driver 3.

As illustrated in FIG. 2, the pixel Pix is connected to other pixels Pix in one and the same row of the display section 6 by the scanning signal line GCL. The scanning signal line GCL is connected to the gate driver 4, and the scanning signal Vscan is supplied from the gate driver 4 to the scanning signal line GCL. Moreover, the pixel Pix is connected to other pixels Pix in one and the same column of the display section 6 by the pixel signal line SGL. The pixel signal line SGL is connected to the source driver 5, and the pixel signal Vpix is supplied from the source driver 5 to the pixel signal line SGL.

Figure 3:
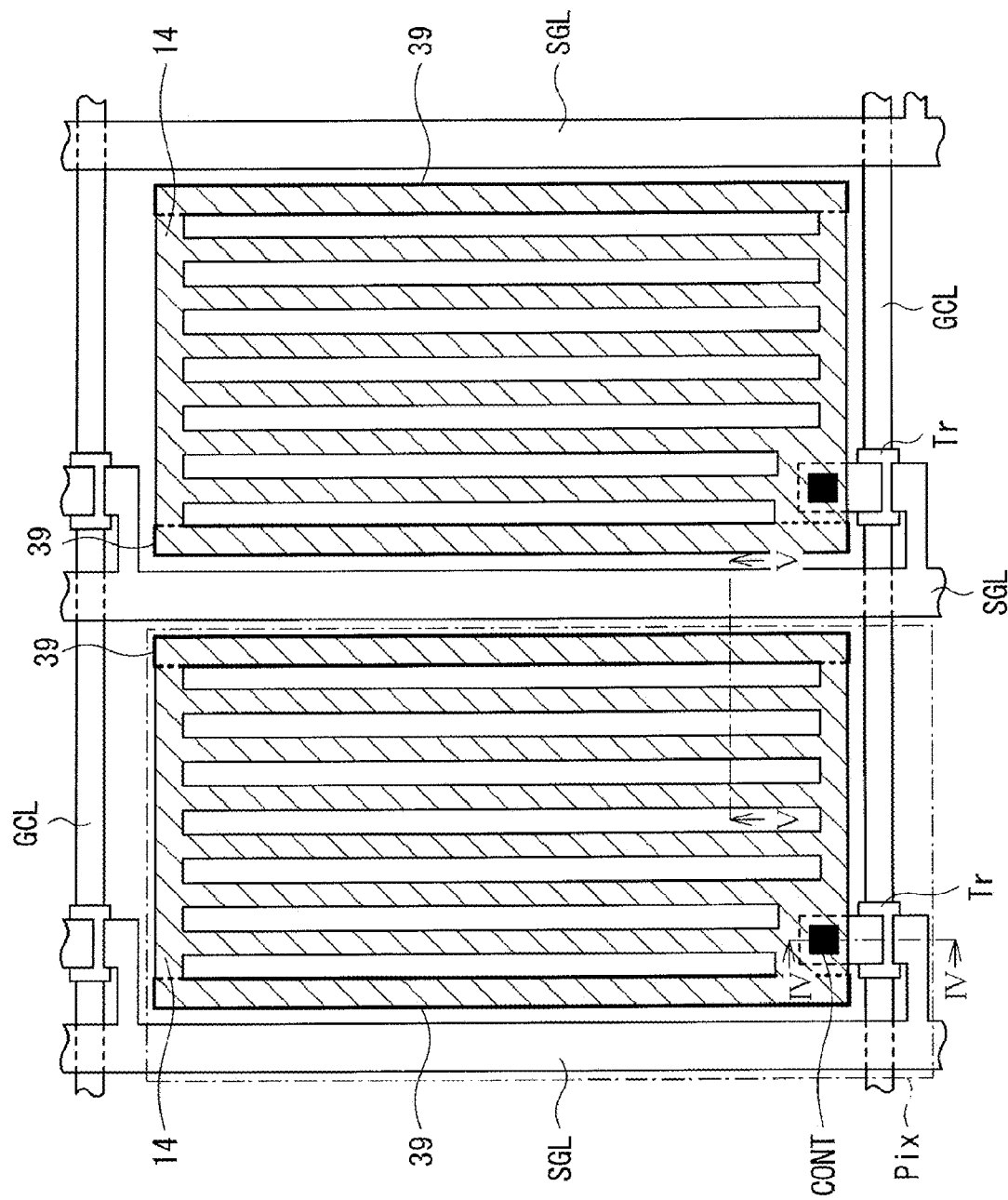
FIG. 3 is a plan view illustrating an example of the display section illustrated in FIG. 3.

FIG. 3 illustrates an example of how the display section 6 may be configured. As illustrated in FIG. 3, the pixel Pix includes a pixel electrode 14 and a light shield 39. In one example, the pixel electrode 14 may be made of ITO (Indium Tin Oxide)

As illustrated in FIG. 3, the pixel electrode 14 is a transparent electrode having a shape in which a plurality of strips arranged side by side at intervals are connected to one another at both ends in a longitudinal direction thereof. More particularly, each pixel electrode extends along first and second directions. As used herein, "first direction" corresponds to a direction along the scanning signal line GCL, whereas "the second direction" corresponds to a direction along the pixel signal SGL line, or a longitudinal direction. As shown in FIG. 3, the plurality of first pixel electrode strips are arranged along the first direction. Further, each of the plurality of first pixel electrode strips extends along the second direction.

The pixel electrode 14 and the transistor Tr are connected to each other through a contact CONT. The light shield 39 is extends along the second direction and is positioned to overlap each outermost strip of the pixel electrode 14 along the first direction. The common electrode 13 (not illustrated in FIG. 3) is formed on a whole layer below the pixel electrode 14. As in the case of the pixel electrode 14, the common electrode 13 is also a transparent electrode that may be made of ITO.

Figure 4:
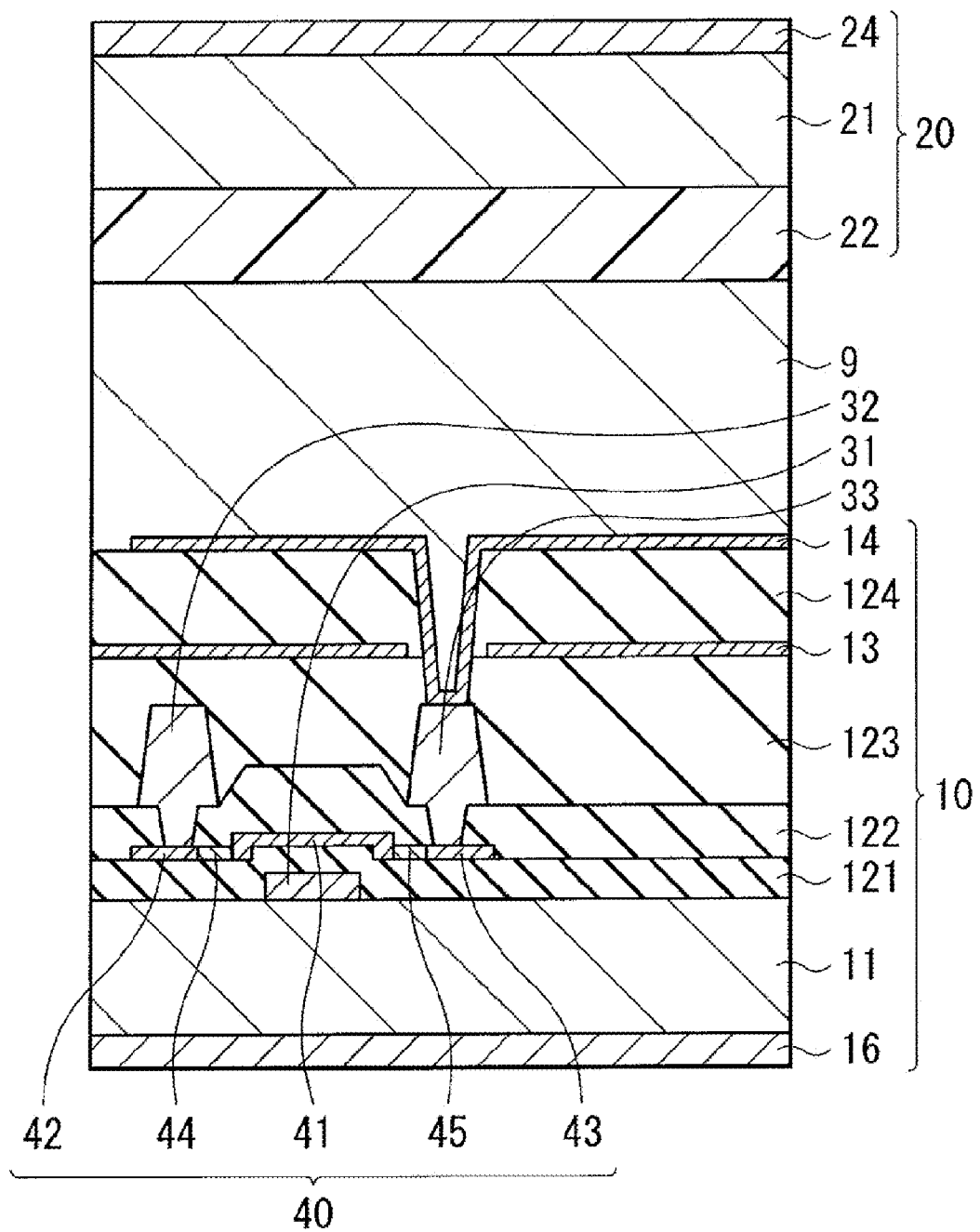
FIG. 4 is a sectional view illustrating the display section illustrated in FIG. 3.
Figure 5A:
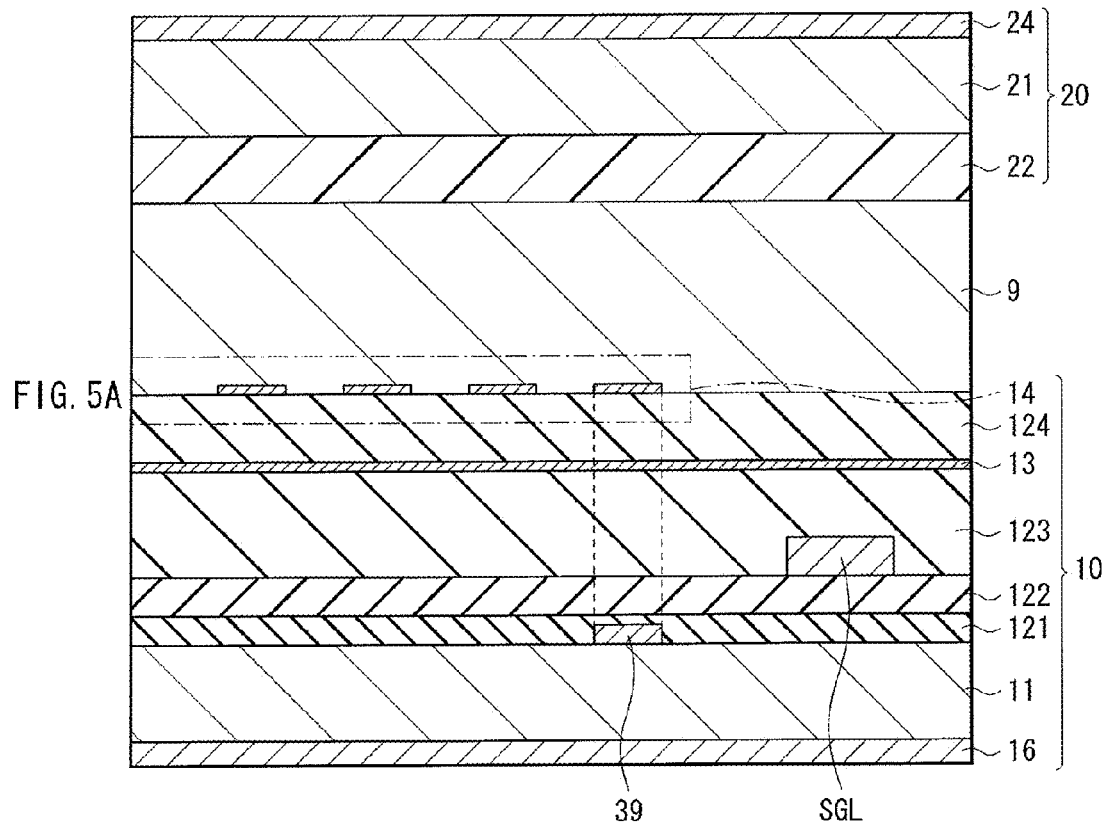
FIGS. 5A and 5B are other sectional views illustrating the display section illustrated in FIG. 3.

FIG. 4 illustrates a sectional view taken along an arrow direction IV-IV of the display section 6 in FIG. 3, and FIG. 5A illustrates a sectional view taken along an arrow direction V-V of the display section 6 in FIG. 3. The display section 6 includes an array substrate 10, a color filter substrate 20 and a liquid crystal layer 9.

The array substrate 10 includes three insulating films 121 to 123, the common electrode 13, an insulating film 124, the pixel electrode 14 and an alignment film 15 (not illustrated), which are formed in such order on a surface facing the liquid crystal layer 9 of a TFT substrate 11. The common electrode 13 is formed on the whole insulating film 123. The common electrode 13 is spaced from the pixel electrode along a third direction, below the pixel electrode 14. Moreover, a polarizing plate 16 is formed on the other surface of the TFT substrate 11.

The color filter substrate 20 includes a color filter 22 and an alignment film 23 (not illustrated), which are formed in such order on a surface facing the liquid crystal layer 9 of an opposed substrate 21. The color filter 22 is configured by periodically arranging, for example, three color filters of red (R), green (G) and blue (B). In the color filter 22, a black matrix (not illustrated) is formed so as to shield light except for an opening or to prevent mixture of light of three colors emitted from adjacent color filters of three colors. A polarizing plate 24 is formed on the other surface of the opposed substrate 21.

The liquid crystal layer 9 modulates light passing therethrough according to the state of an electric field, and is formed of an FFS mode (a lateral electric field mode) liquid crystal.

As illustrated in FIG. 4, the transistor Tr and the insulating films 121 to 123 are formed in the same layer. A gate electrode 31 of the transistor Tr is formed on the TFT substrate 11. The gate electrode 31 is configured using the scanning signal line GCL. In other words, the gate electrode 31 is configured from a part of the scanning signal line GCL formed on the TFT substrate 11. The insulating film 121 is formed on the gate electrode 31 (the scanning signal line GCL), and the semiconductor layer 40 is formed on the insulating film 121. In other words, the insulating film 121 functions as a gate insulating film in a MOS configuration in the transistor Tr.

The semiconductor layer 40 includes a channel layer 41, a source region 42, a drain region 43 and LDD (Lightly Doped Drain) regions 44 and 45. The semiconductor layer 40 may be made of amorphous silicon, polysilicon or single-crystalline silicon. In the channel layer 41, a channel is formed in response to a voltage of the gate electrode 31. For example, the source region 42 and the drain region 43 are doped with an impurity such as an n-type impurity. The LDD regions 44 and 45 are doped with an impurity so that the concentration of the impurity is lower than those in the source region 42 and the drain region 43. The LDD region 44 is formed between the channel layer 41 and the source region 42, and the LDD region 45 is formed between the channel layer 41 and the drain region 43.

The insulating film 122 is formed on the semiconductor layer 40. The source electrode 32 and the drain electrode 33 are formed on the insulating film 122, and are connected to the source region 42 and the drain region 43 through a contact hole, respectively. The source electrode 42 is connected to the pixel signal line SGL (refer to FIG. 5A) formed in the same layer. The drain electrode 33 is connected to the pixel electrode 14 through the contact CONT.

As illustrated in FIG. 5A, the light shield 39 is formed on the TFT substrate 11, and is positioned to overlap each outermost strip of the pixel electrode 14 (e.g., an entire outermost strip, as in FIG. 5) along the first direction. In an example illustrated in FIG. 5A, the light shield 39 and the scanning signal line GCL (refer to FIG. 4), which is in a layer spaced from the pixel electrode along the third direction, are in the same layer, and are formed from the same material. Therefore, the light shield 39 and the scanning signal line GCL are may be formed concurrently in one and the same step of a manufacturing process. The light shield 39 is not connected to the scanning signal line GCL and is electrically insulated from surroundings.

FIGS. 6A and 6B illustrate an example of a display operation of a liquid crystal element, and illustrate the directions of a polarizing plate 16 and an alignment film 15. As illustrated in FIGS. 6A and 6B, the polarizing plate 16 and the polarizing plate 24 are arranged in a crossed Nichol state. In other words, in this example, the transmission axis of the polarizing plate 16 is set in a direction orthogonal to a longitudinal direction of the strips of the pixel electrode 14 (or the second direction) or a direction slightly angled from that direction, and the transmission axis of the polarizing plate 24 is set in the longitudinal direction of the strips of the pixel electrode 14 or a direction slightly angled from that direction. The rubbing directions of the alignment film 15 and the alignment film 23 are set so as to be oriented along the transmission axis of the polarizing plate 24.

Note that as used herein, the array substrate 10 is a an example of a "first substrate", and the color filter substrate 20 is a an example of a "second substrate". The insulating film 124 is an example of a "an insulating film". The pixel signal line SGL is an example of a "first wiring line", and the scanning signal line GCL is an example of a "second wiring line". The color filter 22 is an example of a "color filter layer" in the invention. Further, in the embodiments of the present invention, as illustrated in FIG. 4 for instance, pixel electrodes and a common electrode are formed on the same substrate, such as the array substrate.

b. Operation and Functions

Next, the operation and functions of the liquid crystal display 1 according to the first embodiment will be described below.

The display control section 2 supplies image signals for one horizontal line to the source driver 5 based on the supplied image signal Vsig, and supplies the timing control signal to the common signal driver 3, the gate driver 4 and the source driver 5, and controls them so as to operate in conjunction with one another. The common signal driver 3 produces the common signal Vcom for performing a frame reverse drive, and supplies the common signal Vcom to the display section 6. The gate driver 4 produces the scanning signal Vscan, and supplies the scanning signal Vscan to the display section 6 through the scanning signal line GCL. The source driver 5 produces the pixel signal Vpix based on the image signals for one horizontal line, and supplies the pixel signal Vpix to the display section 6 through the pixel signal line SGL. The display section 6 performs display of each horizontal line based on the supplied pixel signal Vpix, the supplied scanning signal Vscan and the supplied common signal Vcom so that an image is displayed on the display section 6 by line-sequential scanning.

Next, referring to FIGS. 6A, 6B, 7A and 7B, the operation of the FFS mode liquid crystal will be described below.

Figure 7A:
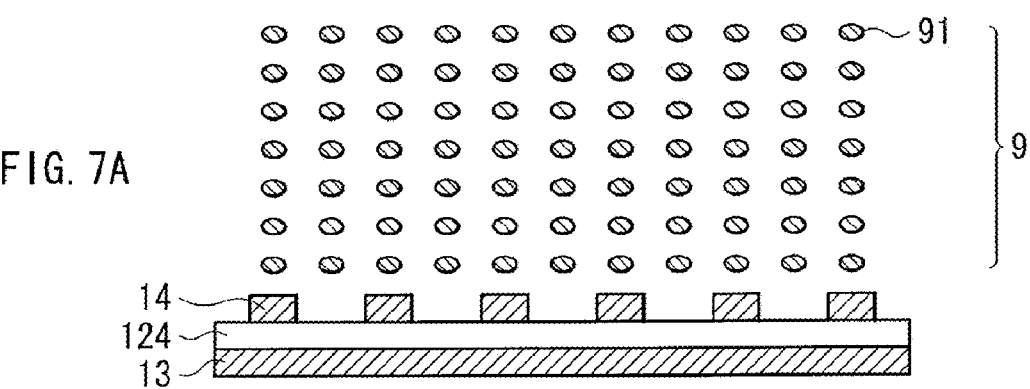
FIGS. 7A and 7B are sectional views for describing operation of the display section illustrated in FIG. 1.
Figure 7B:
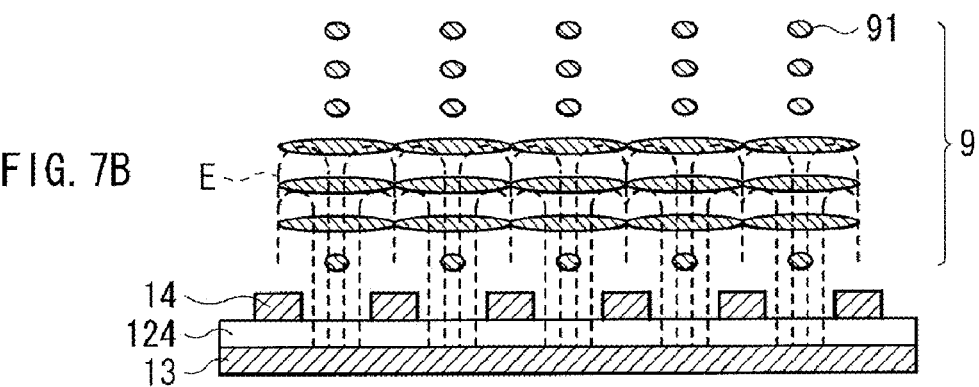

In FIG. 6A illustrates an example of a display operation of the liquid crystal element in a state (a no-voltage applied state) where there is no potential difference between the pixel electrode 14 and the common electrode 13 and FIG. 6B illustrates a display operation example of the liquid crystal element in a state (a voltage applied state) where there is a potential difference. FIGS. 7A and 7B illustrate operation examples of liquid crystal molecules in the no-voltage applied state and the voltage applied state, respectively.

As illustrated in FIGS. 6A and 7A, in liquid crystal molecules 91 of the liquid crystal layer 9 in the no-voltage applied state, the axes of the liquid crystal molecules 91 are orthogonal to the transmission axis of the polarizing plate 16 and parallel to the transmission axis of the polarizing plate 24 (refer to FIG. 6A). Therefore, incident light h having passed through the polarizing plate 16 reaches the polarizing plate 24 without producing a phase difference in the liquid crystal layer 9 and is absorbed into the polarizing plate 24. In other words, in the no-voltage applied state, the pixel displays black. On the other hand, in the voltage applied state, as illustrated in FIGS. 6B and 7B, the axes of the liquid crystal molecules 91 are rotated in a direction shifted from the longitudinal direction of the strips of the pixel electrode 14 by a lateral electric field E. In the case where liquid crystal molecules 91 positioned in a center in a thickness direction of the liquid crystal layer 9 are rotated by 45° from the longitudinal direction of the strips of the pixel electrode 14, the incident light h having passed through the polarizing plate 16 produces a phase difference while passing through the liquid crystal layer 9 and is converted into linearly polarized light rotated 90° to reach and pass through the polarizing plate 24. In other words, in a state where a potential difference is provided so as to rotate the liquid crystal molecules 91 by 45°, the pixel displays white.

c. Functions of Light Shield

As illustrated in FIGS. 3 and 5A, the light shield 39 is positioned to overlap each outermost strip of the pixel electrode 14 along the first direction. As will be described later in a comparative example, the light shield 39 is arranged in a region corresponding to each outermost strip of the pixel electrode 14 where the influence of a flexoelectric effect is pronounced. More specifically, in the case where the light shield is not arranged in this region, a difference in light transmittance between a positive frame and a negative frame is produced to cause flickers. Moreover, a so-called burn-in in which a previous display state affects a present display state occurs. In the liquid crystal display 1, because the light shield is the region where the influence of a flexoelectric effect is pronounced, flickers and burn-in are reduced, and high image quality is achievable.

d. Comparative Example

Next, a liquid crystal display according to a comparative example will be described below. In the comparative example, the liquid crystal display is configured using a display section 6R not including the light shield. Other configurations are the same as those in the first embodiment (refer to FIGS. 1 and 3). Note that like components are denoted by like numerals as of the liquid crystal display 1 according to the first embodiment and will not be further described.

Figure 8:
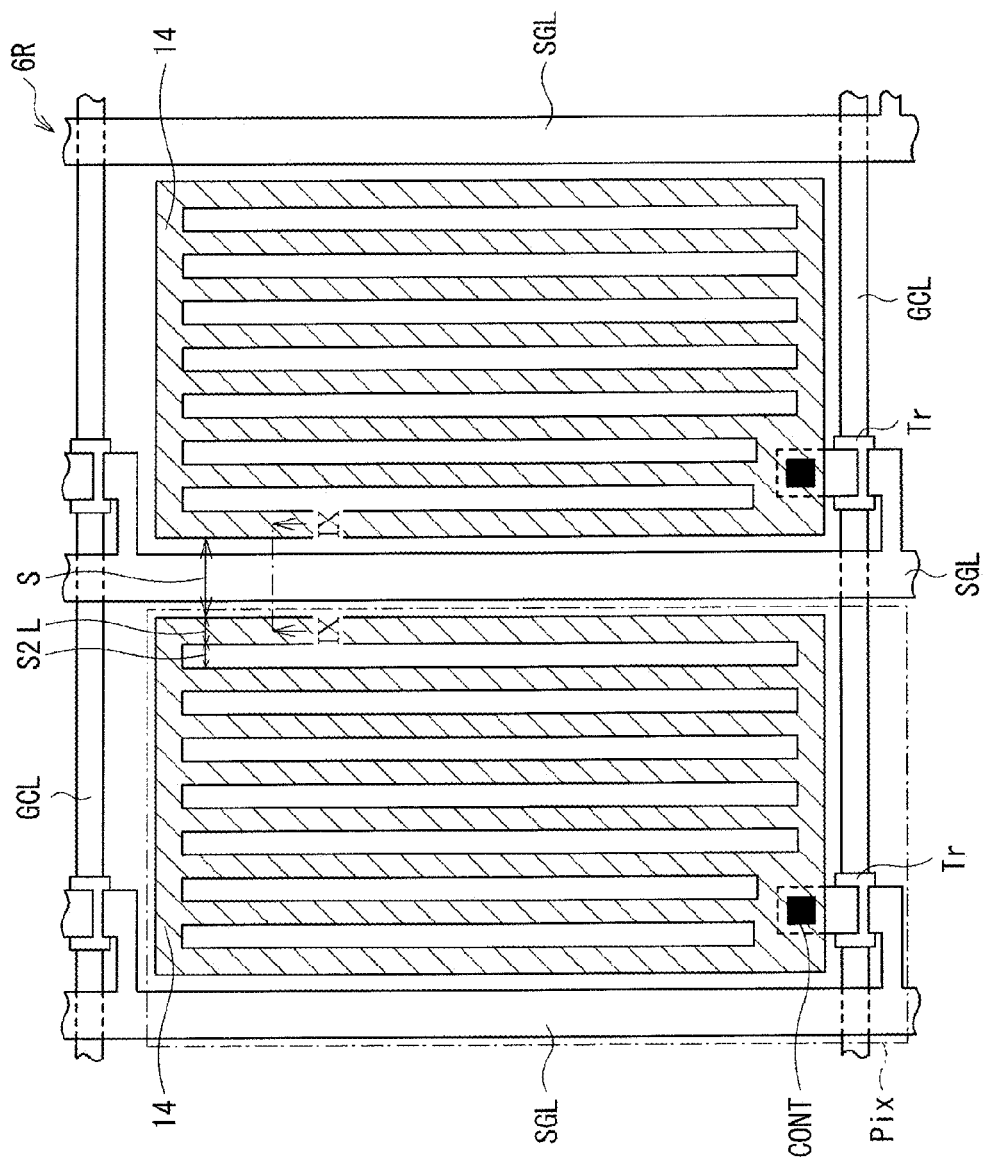
FIG. 8 is a plan view illustrating an example of a display section according to a comparative example.

FIG. 8 illustrates an example of the display section 6R according to the comparative example. In pixel Pix of the display section 6R, unlike the display section 6 (refer to FIG. 3) according to the first embodiment, the light shield is not provided.

Figure 9:
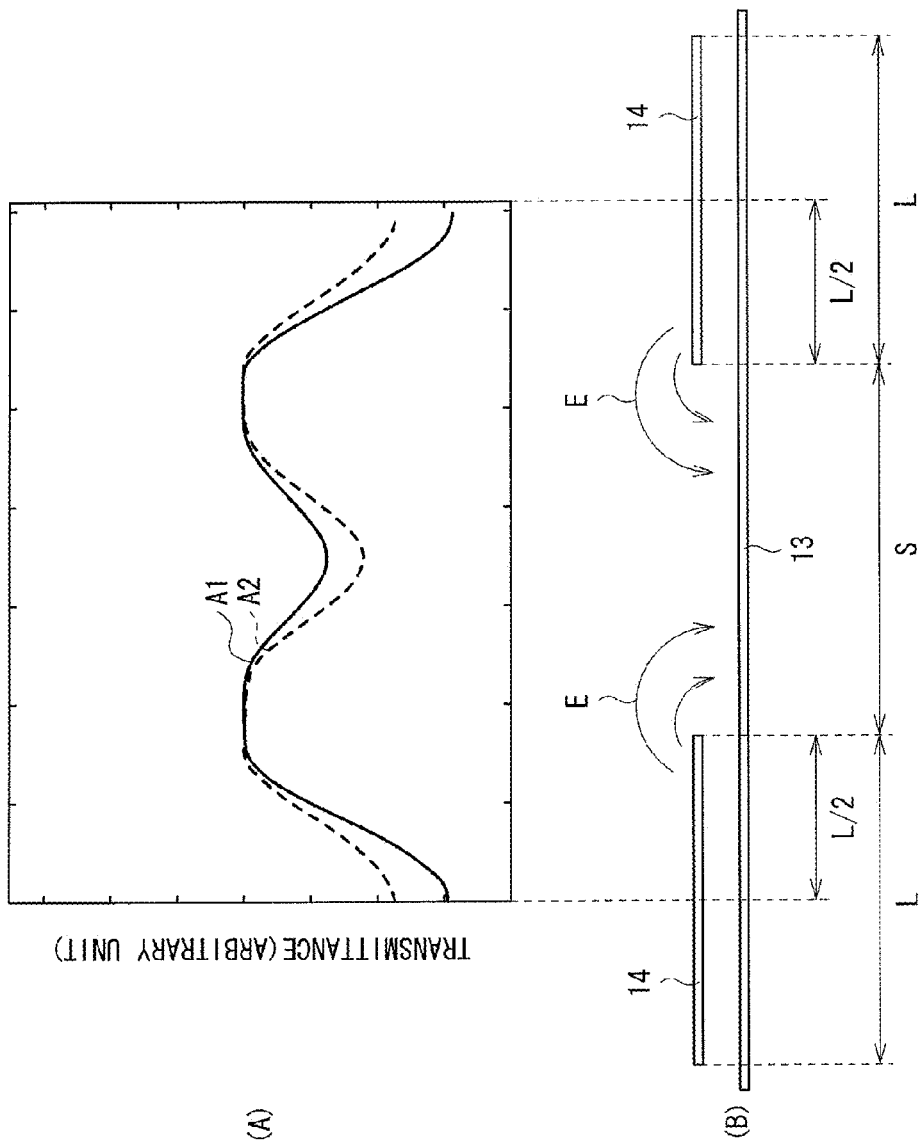
FIG. 9 is a plot illustrating characteristics of a liquid crystal display illustrated in FIG. 8.
Figure 10:
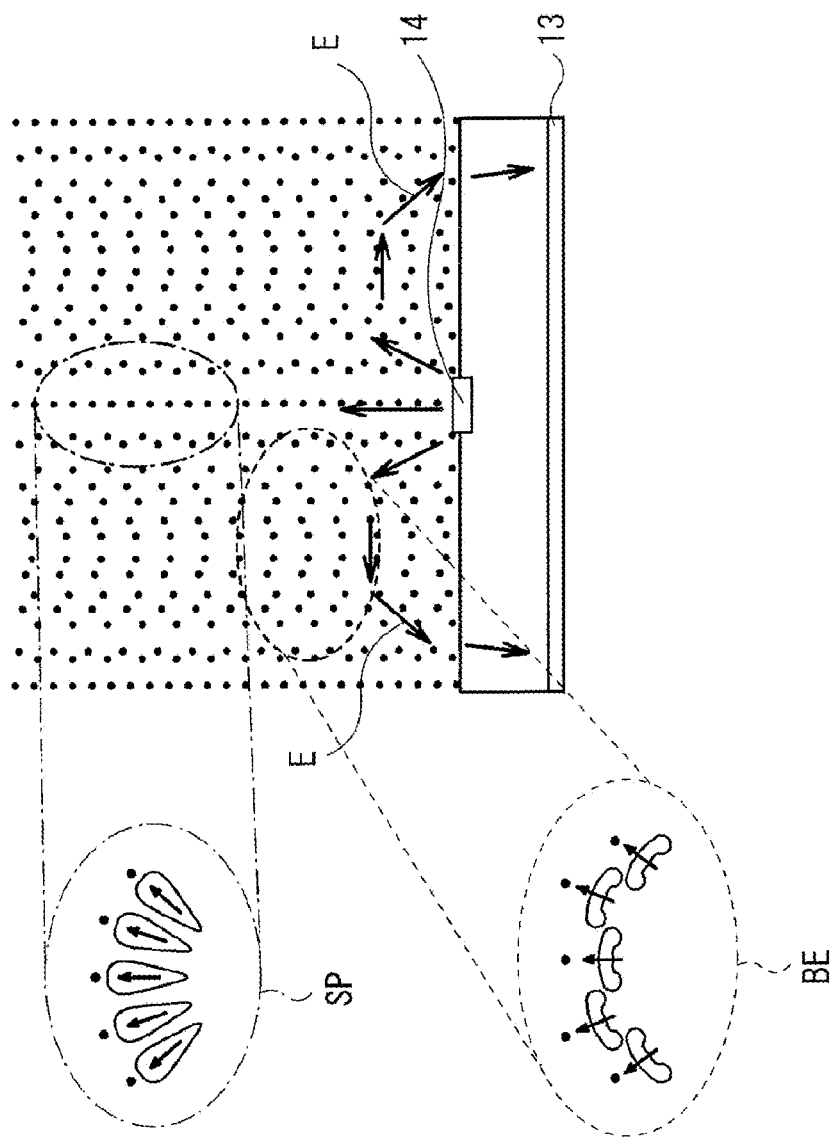
FIG. 10 is a view illustrating alignment deformation in the liquid crystal display illustrated in FIG. 8.

A part A in FIG. 9 illustrates simulation values of transmittance with a flexoelectric effect in a line segment IX-IX of the display section 6R illustrated in FIG. 8, and a part B in FIG. 9 illustrates a sectional view of taken along an arrow direction IX-IX and a lateral electric field. In the part B in FIG. 9, S indicates an interval between the pixel electrodes 14 of adjacent pixels Pix, and L indicates an electrode width of the strip of the pixel electrode 14. FIG. 10 illustrates a view of splay deformation and bend deformation which occur in the display section 6R.

As illustrated in the part A in FIG. 9, transmittance A1 of a positive frame and transmittance A2 of a negative frame in a region on the pixel electrode 14 are different from those in a region between the pixel electrodes 14, because as illustrated in FIG. 10, splay deformation in the liquid crystal is predominantly induced on the pixel electrode 14, and bend deformation in the liquid crystal is predominantly induced between the pixel electrodes 14. In other words, this is because in these regions, the liquid crystal is easily polarized due to a flexoelectric effect, and there is a difference in transmittance between the positive frame and the negative frame.

Figure 11:
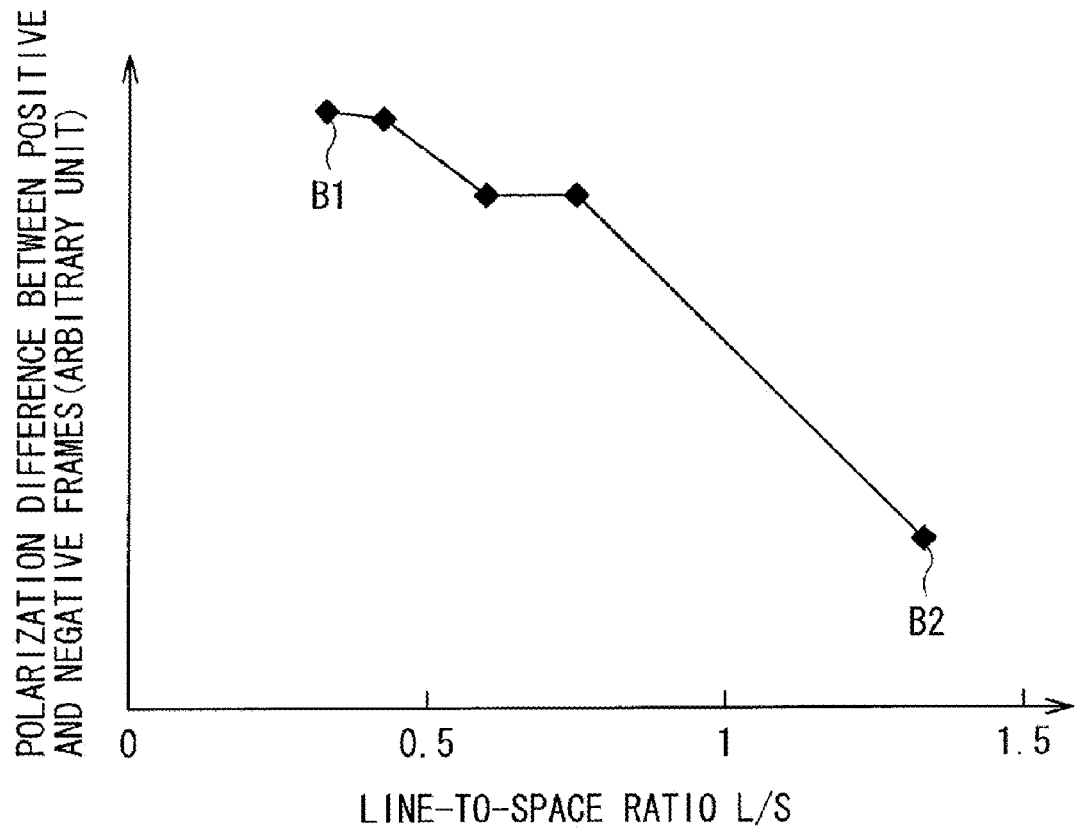
FIG. 11 is another plot illustrating the characteristics of the liquid crystal display illustrated in FIG. 8.

FIG. 11 illustrates a difference in polarization between the positive and negative frames in the liquid crystal around each outermost strip of the pixel electrode 14 in the display section 6R illustrated in FIG. 8, and illustrates simulation values of a difference in polarization when the value of a ratio (a line-to-space ratio) L/S between the electrode width L (a line) and an electrode interval S (a space) is changed. In this case, the electrode width L is fixed and the electrode interval S is changed to change the line-to-space ratio L/S. In FIG. 11, B1 indicates a difference in polarization when the electrode interval S is large, and B2 indicates a difference in polarization when the electrode interval S is reduced to be equal to a distance S2 between the strips in the pixel electrode 14 (refer to FIG. 8). In other words, B1 indicates a difference in polarization of the liquid crystal around each outermost strip of the pixel electrode 14, and B2 indicates a difference in polarization of the liquid crystal around a strip positioned around the center of the pixel electrode 14. The simulation result indicates that the difference in polarization of the liquid crystal between the positive and negative frames caused by a flexoelectric effect around each outermost strip (B1) of the pixel electrode 14 is larger than that around the strip around the center (B2) of the pixel electrode 14. Therefore, a difference in light transmittance between the positive frame and the negative frame is produced specifically around each outermost strip of the pixel electrode 14.

Thus, in the liquid crystal display according to the comparative example, as a difference in light transmittance between the positive frame and the negative frame is produced around each outermost strip of the pixel electrode 14, luminance of the liquid crystal display varies from frame to frame to cause flickers.

On the other hand, in the liquid crystal display 1 according to the first embodiment, as illustrated in FIG. 3, in the pixel Pix, the light shield 39 is arranged in a region corresponding to each outermost strip of the pixel electrode 14 where a largest difference in transmittance occurs. Therefore, flickers are allowed to be reduced, and high image quality is achievable. In addition, as illustrated in FIG. 3, in a region between the pixel electrodes, light is shielded by the pixel signal line SGL, so flickers is less likely to occur.

Moreover, a flexoelectric effect causes a so-called burn-in in which a previous display state affects a present display state. Burn-in in the liquid crystal display according to the comparative example will be described below.

Figure 12A:
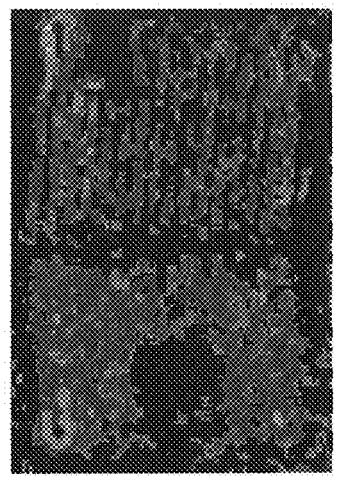
FIGS. 12A, 12B and 12C are diagrams illustrating other characteristics of the liquid crystal display illustrated in FIG. 8.
Figure 12B:
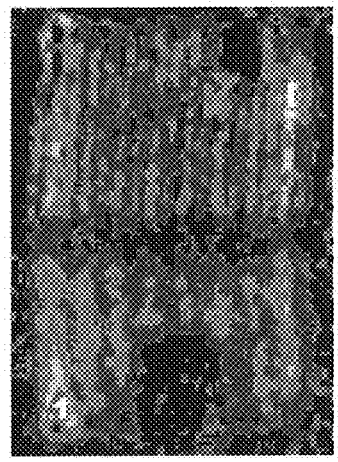
Figure 12C:
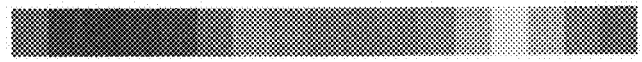

FIGS. 12A, 12B and 12C illustrate example results of a burn-in measurement in the case where the liquid crystal display according to the comparative example is used. The measurement of a burn-in was performed in the following manner. First, a gray raster screen (a totally gray screen) was displayed to determine a pixel transmittance distribution. Next, a black and white checkered flag screen was displayed for a few hours. Then, the gray raster screen was displayed again to determine a pixel transmittance distribution. Then, a difference between a screen transmittance distribution in the case where the first gray raster screen was displayed and a screen transmittance distribution in the case where the last gray raster screen was displayed was determined. FIGS. 12A and 12B illustrate, by colors, differences between transmittance distributions before and after a burn-in test in a pixel displaying black and a pixel displaying white, respectively, in the checkered flag screen, and FIG. 12C illustrates a relationship between a transmittance change and color. As illustrated in FIGS. 12A to 12C, in the pixel displaying white, the transmittance is largely changed in the whole pixel. In particular, the transmittance around each outermost strip of the pixel electrode is largely changed. In other words, in the liquid crystal display according to the comparative example, a so-called burn-in occurs.

A burn-in phenomenon occurs as follows. In the liquid crystal display according to the comparative example, as illustrated in FIG. 11, a difference in polarization between the positive and negative frames is produced due to a flexoelectric effect. In the case where an AC drive is performed, even if a potential with the same magnitude is applied to each of the positive frame and the negative frame, a state where different potentials (a residual DC potential difference) continue to be applied due to the difference in polarization continues. Due to the residual DC potential difference, impurity ions in a cell are gathered around the alignment film of the pixel electrode. The impurity ions are accumulated in the alignment film for a long time due to a difference in mobility of impurity ions or the like. In this state, even if a potential is not applied to a liquid crystal cell, a voltage is continuously applied. The pixel displaying white falls in a state where an additional voltage due to the residual DC potential difference, in addition to an actually applied potential, is applied so that compared to a region displaying black, luminance is changed. This causes burn-in.

As described above, in the liquid crystal display according to the comparative example, burn-in, in which a previous display state affects a present display state, easily occurs, and image quality easily declines.

On the other hand, in the liquid crystal display 1 according to the first embodiment, in the pixel Pix, the light shield 39 is arranged in a region corresponding to each outermost strip of the pixel electrode 14 where burn-in is most likely to occur. Thus, the influence of burn-in on display is allowed to be reduced, and high image quality is achievable.

d. Effects of Light Shield

As described above, in the embodiment, the light shield is positioned to overlap each outermost strip of the pixel electrode, so flickers and burn-in are reduced to make high image quality achievable.

Moreover, in the embodiment, the light shield and the scanning signal line GCL are in the same layer and are formed from the same material As a result, the configuration of a liquid crystal display is simplified, and it is not necessary to add a manufacturing step for forming the light shield. Accordingly, a manufacturing cost may not increase.

e. Modification 1-1

Figure 13:
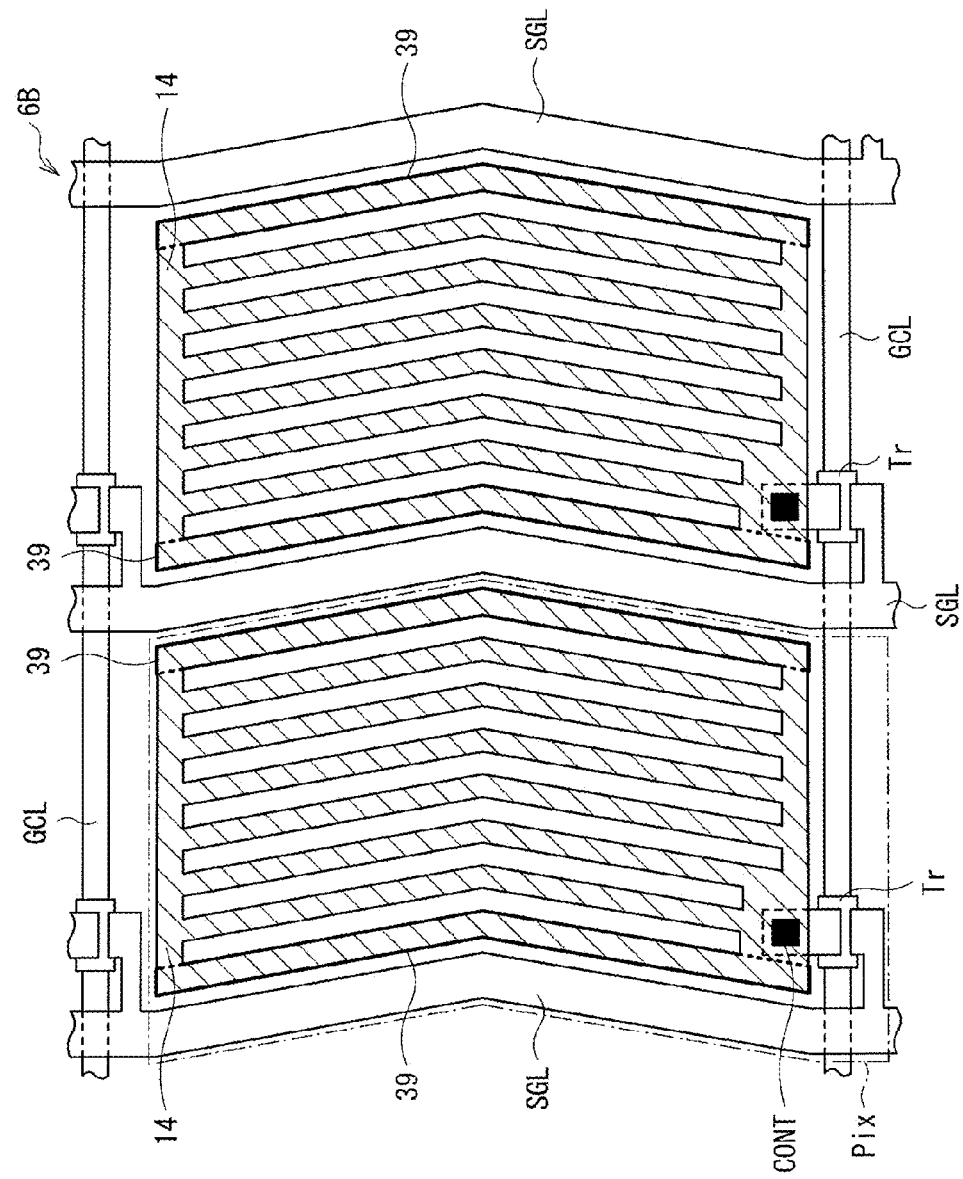
FIG. 13 is a plan view illustrating an example of a display section according to a modification of the first embodiment.

In the above-described embodiment, as illustrated in FIG. 3, the pixel electrode is comprises a plurality of straight strips, but the invention is not limited thereto, and, for example, the pixel electrode may comprise a plurality of bent strips as illustrated in FIG. 13.

f. Other Modifications

In the above-described embodiment, as shown in FIG. 5 for example, the light shield 39 is positioned to overlap each outermost strip of the pixel electrode 14 along the first direction in its entirety, but the invention is not limited thereto. For example, the light shield may be positioned to overlap a part of each outermost strip. In this case, it is desirable to position the light shield such that the light shield overlaps at least a central portion of the outermost strip along a width direction of the strip (or along the first direction), because as illustrated in FIG. 9, a pronounced difference in light transmittance between the positive frame and the negative frame is produced in the central portion of the strip (a left end and a right end in the part A in FIG. 9). Alternately, the light shield may be positioned to overlap each outermost strip in its entirety.

Figure 5B:

FIG. 5B illustrates a positional relationship between the pixel electrode 14 and the light shield. A light shield 39A is positioned to overlap at least a central portion of each outermost strip along a width direction of the outermost strip (or along the first direction). Each of light shields 39B and 39C is positioned to overlap the central portion of the outermost strip, and each further overlaps a larger region of the outermost strip than the region overlapped by the light shield 39A. A light shield 39D is then positioned to overlap each outermost strip in its entirety.

In the above-described embodiment, the light shield and the scanning signal line GCL are in the same layer and are formed from the same material, but the invention is not limited thereto. For example, the light shield may be formed from a different material than that of the scanning signal line GCL but be in the same layer with the scanning signal line GCL. Moreover, for example, the light shield and the pixel signal line SGL may be in the same layer and be formed from the same material, or the light shield may be formed as a separate body from the pixel signal line SGL.

2. Second Embodiment

Next, a liquid crystal display according to a second embodiment will be described below. In the second embodiment, the position of the light shield in a pixel is different from that in the first embodiment. In other words, in the first embodiment (refer to FIG. 3), the light shield is arranged in a region corresponding to the outermost strip of the pixel electrode, but in the present embodiment, the light shield is also arranged in a region between the pixel electrodes of adjacent pixels. Other configurations are the same as those in the first embodiment (refer to FIGS. 1 and 3). Note that like components are denoted by like numerals as of the liquid crystal display according to the first embodiment and will not be further described.

Figure 14:
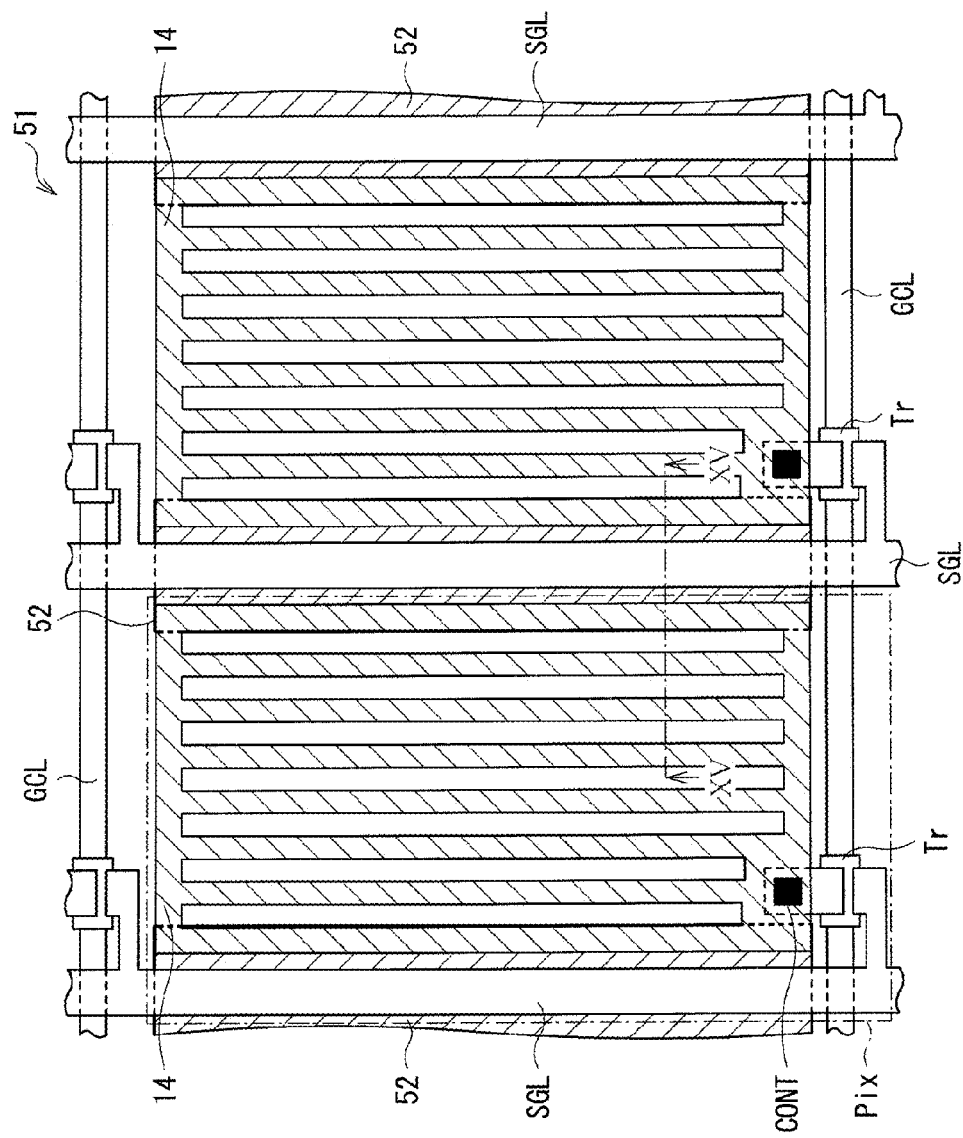
FIG. 14 is a plan view illustrating a configuration example of a display section according to a second embodiment.
Figure 15:
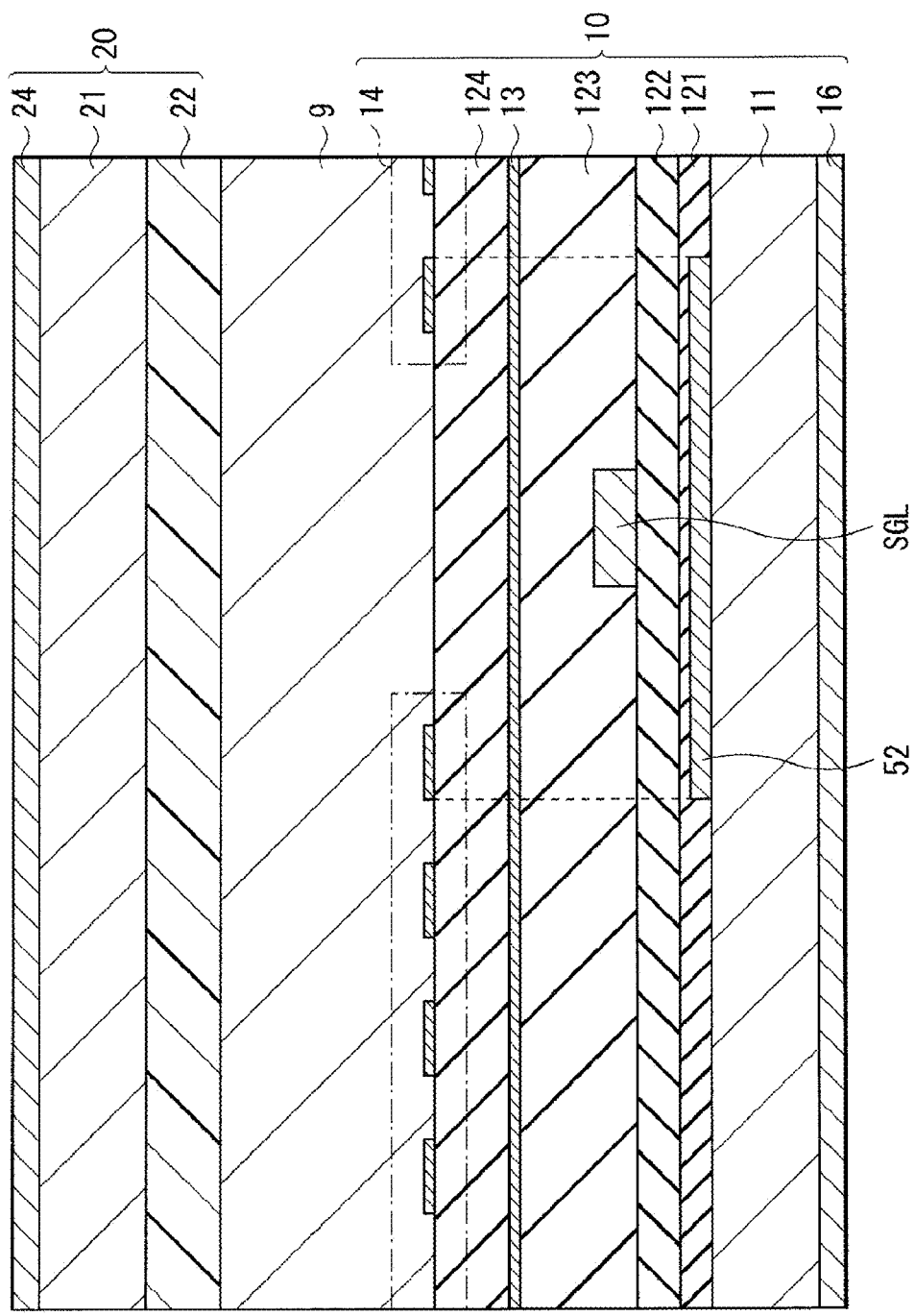
FIG. 15 is a sectional view illustrating the display section illustrated in FIG. 14.

FIG. 14 illustrates an example of a display section 51 according to the second embodiment, and FIG. 15 illustrates a sectional view taken along an arrow direction XV-XV of the display section 51 illustrated in FIG. 14. The display section 51 includes a light shield 52. The light shield 52 extends along the first direction from a region corresponding to an outermost strip of the pixel electrode 14 in one pixel to a region corresponding to an adjacent outermost strip of the pixel electrode 14 in a pixel adjacent to the one pixel. In particular, in this embodiment, the light shield 52 additionally overlaps at least part of an outermost strip of the adjacent pixel electrode. In other words, the light shield 52 is arranged in a region between the pixel electrodes of adjacent pixels Pix in addition to the region corresponding to each outermost strip of the pixel electrodes 14. As in the case of the first embodiment (refer to FIGS. 4, 5A and 5B), the light shield 52 and the scanning signal line GCL (refer to FIG. 4) are in the same layer and are formed from the same material. In other words, the light shield 52 and the scanning signal line GCL are allowed to be formed concurrently in one and the same step of a manufacturing process. The light shield 52 is not connected to the scanning signal line GCL, and is electrically insulated from surroundings.

In the display section 51, as in the case of the first embodiment, when the light shield 52 is formed, the influence of a flexoelectric effect on a displayed image is may be reduced. In particular, the light shield 52 prevents light from passing through a region between the pixel electrodes; therefore, compared to the case where the light shield is not arranged in the region between the pixel electrodes and light is shielded only by the pixel signal line (the first embodiment), flickers may be reduced more reliably.

As described above, in this embodiment, the light shield is also arranged in a region between the pixel electrodes of adjacent pixels in addition to the region corresponding to each outermost strip of the pixel electrode; therefore, flickers may be further reduced, and high image quality is achievable. Other effects are the same as those in the first embodiment.

In the above-described embodiment, the light shield is formed from the same material as that of the scanning signal line GCL, but the invention is not limited thereto, and the light shield may be formed from a different material than that of the scanning signal line GCL.

3. Third Embodiment

Next, a liquid crystal display according to a third embodiment of the invention will be described below. In the third embodiment, the pixel signal line doubles as a light shield. Other configurations are the same as those in the first embodiment (refer to FIGS. 1 and 3). Note that like components are denoted by like numerals as of the liquid crystal display according to the first embodiment and will not be further described.

Figure 16:
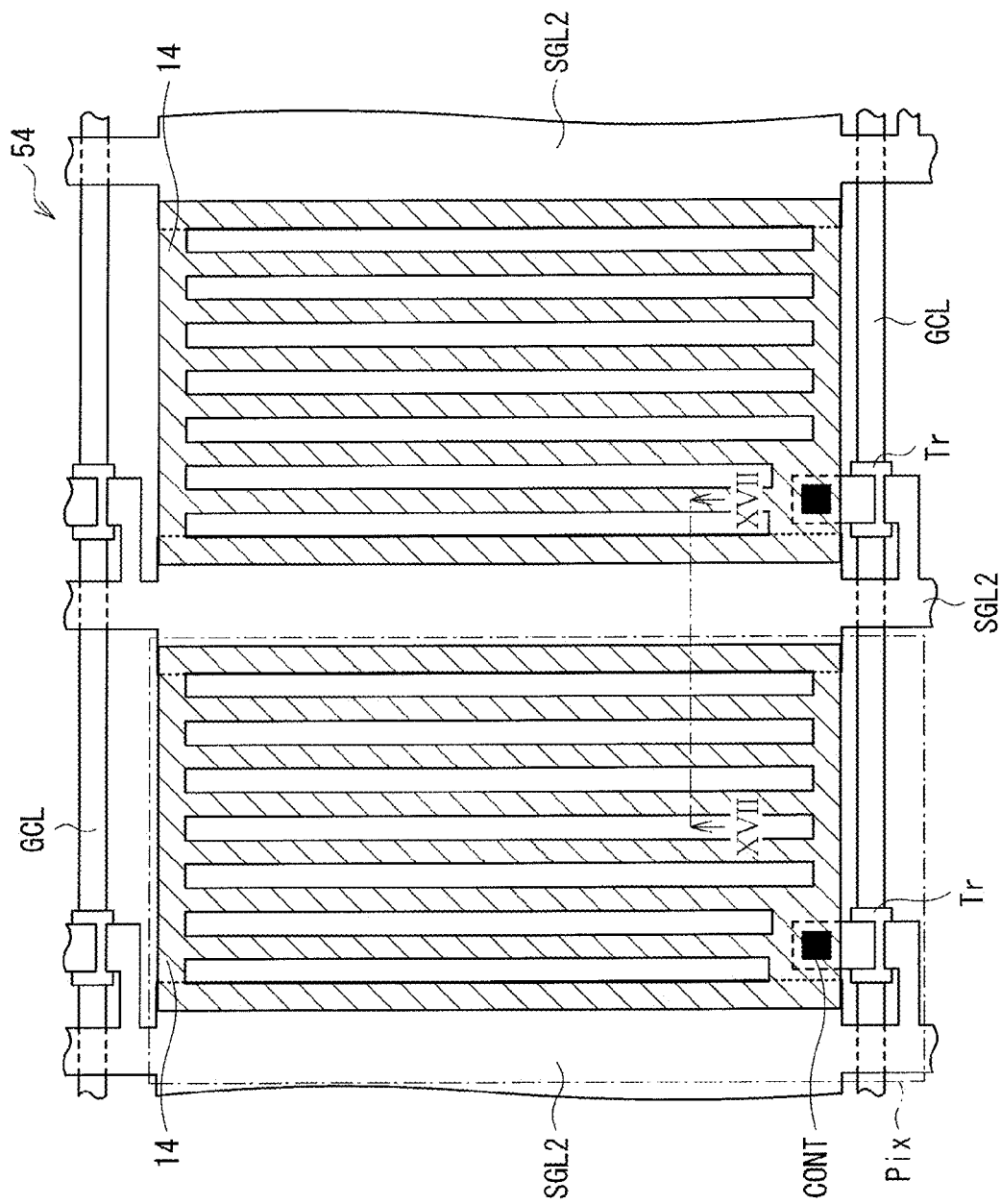
FIG. 16 is a plan view illustrating a configuration example of a display section according to a third embodiment.
Figure 17:
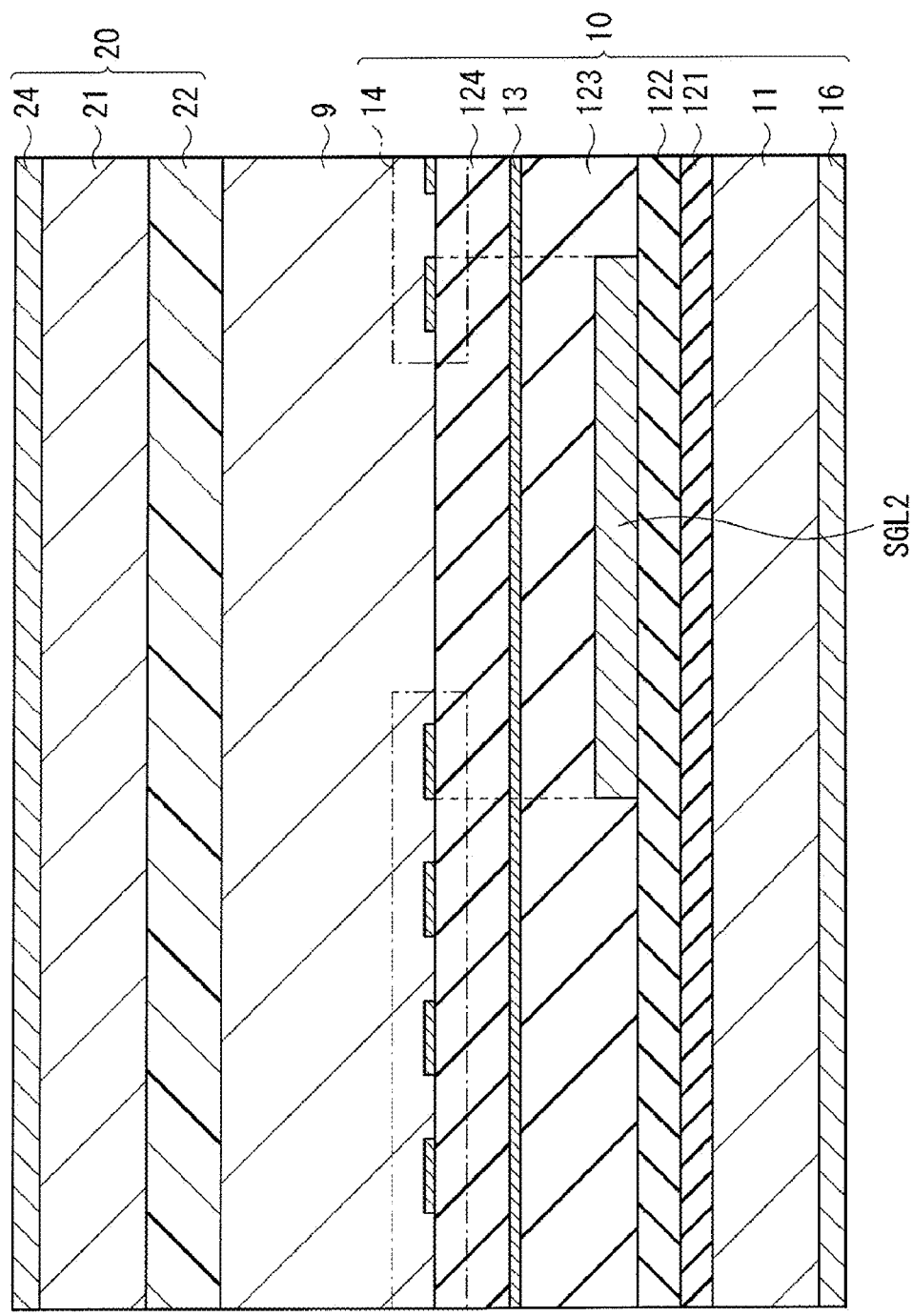
FIG. 17 is a sectional view illustrating the display section illustrated in FIG. 16.

FIG. 16 illustrates a configuration example of a display section 54 according to the third embodiment, and FIG. 17 illustrates a sectional view taken along an arrow direction XVII-XVII of the display section 54 illustrated in FIG. 16. The display section 54 includes a pixel signal line SGL2. The pixel signal line SGL2 has a large width along the first direction, and overlaps outermost strips of the pixel electrodes 14 of pixels Pix adjacent to the pixel signal line SGL2 on both sides.

The pixel signal line SGL2 corresponds to an example of "first wiring line" and an example of "light shield" in the invention.

The pixel signal line SGL2 is made of metal, and shields light. Therefore, the pixel signal line SGL2 has the same effects as those of the light shield in the first embodiment or the like. In other words, when the display section 54 includes the pixel signal line SGL2, as in the case of the first embodiment or the like, the influence of a flexoelectric effect on a displayed image is allowed to be reduced.

As described above, in this embodiment, the pixel signal line has a large width along the first direction so as to extend to regions corresponding to the outermost strips of the pixel electrodes adjacent to the pixel signal line. Therefore, the liquid crystal display has a simple configuration because a dedicated light shield is not arranged, and a light-shielding function may be obtained without adding a manufacturing step. Other effects are the same as those in the first embodiment or the like.

4. Fourth Embodiment

Next, a liquid crystal display according to a fourth embodiment will be described below. In the fourth embodiment, a black matrix for preventing color mixture is used as a light shield for reducing the influence of a flexoelectric effect on a displayed image. Other configurations are the same as those in the first embodiment (refer to FIGS. 1 and 3) or the like. Note that like components are denoted by like numerals as of the liquid crystal display according to the first embodiment and will not be further described.

Figure 18:
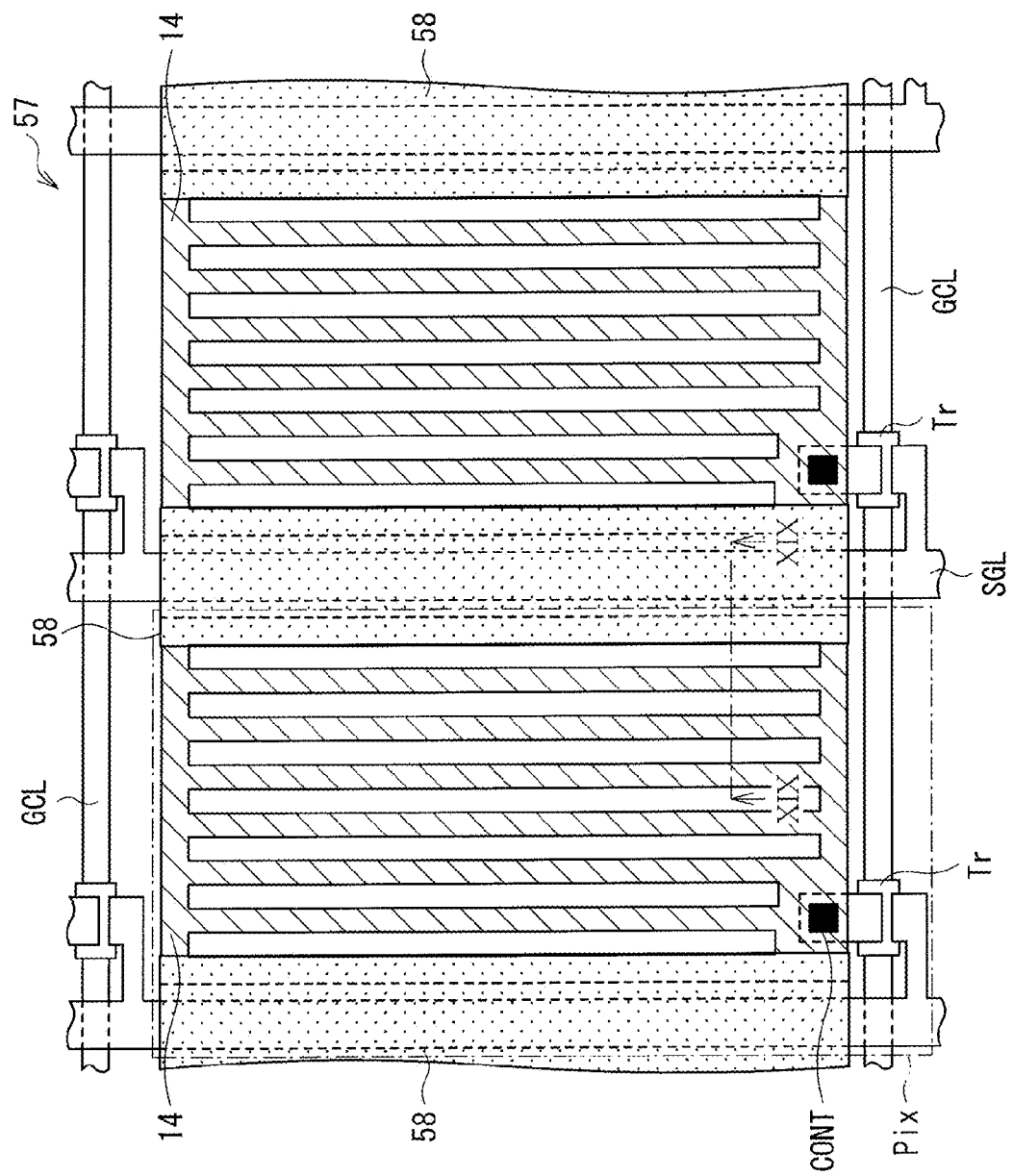
FIG. 18 is a plan view illustrating an example of a display section according to a fourth embodiment.
Figure 19:
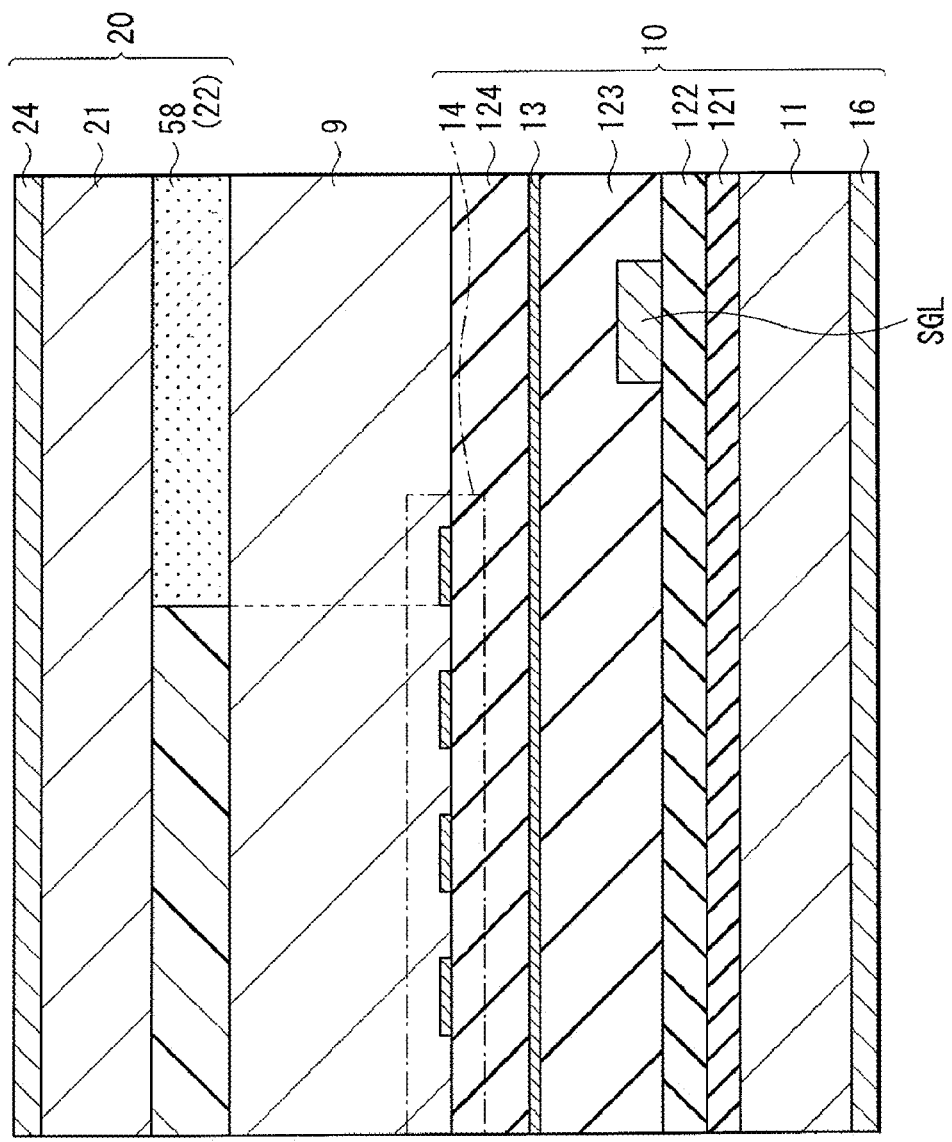
FIG. 19 is a sectional view illustrating the display section illustrated in FIG. 18.

FIG. 18 illustrates an example of a display section 57 according to the fourth embodiment, and FIG. 19 illustrates a sectional view taken along an arrow direction XIX-XIX of the display section 57 illustrated in FIG. 18. The display section 57 includes a light shield 58. As in the case of the second embodiment, the light shield 58 extends from a region corresponding to an outermost strip of the pixel electrode 14 in one pixel to a region corresponding to an outermost strip of the pixel electrode 14 in a pixel adjacent to the one pixel. The light shield 58 is formed in the color filter 22 from a so-called black matrix. In other words, in the display section 57, a black matrix arranged in the color filter extends to a part where a flexoelectric effect affects a displayed image.

In the display section 57, the light shield 58 is arranged in the color filter 22; therefore, as in the case of the first embodiment or the like, the influence of a flexoelectric effect on a displayed image may be reduced. In particular, since the light shield 58 is in contact with the liquid crystal layer 9 in which the light transmittance varies due to a flexoelectric effect, the light shield 58 can effectively shield incident light from an oblique direction shifted from a direction perpendicular to polarizing plate 16 of incident light having passed through the polarizing plate 16.

As described above, in this embodiment, the light shield is configured from a black matrix in the color filter. Therefore, a simple configuration is achievable without adding a manufacturing step and a dedicated light shield.

Moreover, in the embodiment, the light shield is formed in a part close to the liquid crystal layer 9. As a result, the light shield can effectively shield incident light from an oblique direction. Other effects are the same as those in the first embodiment or the like.

a. Modification 4-1

Figure 20:
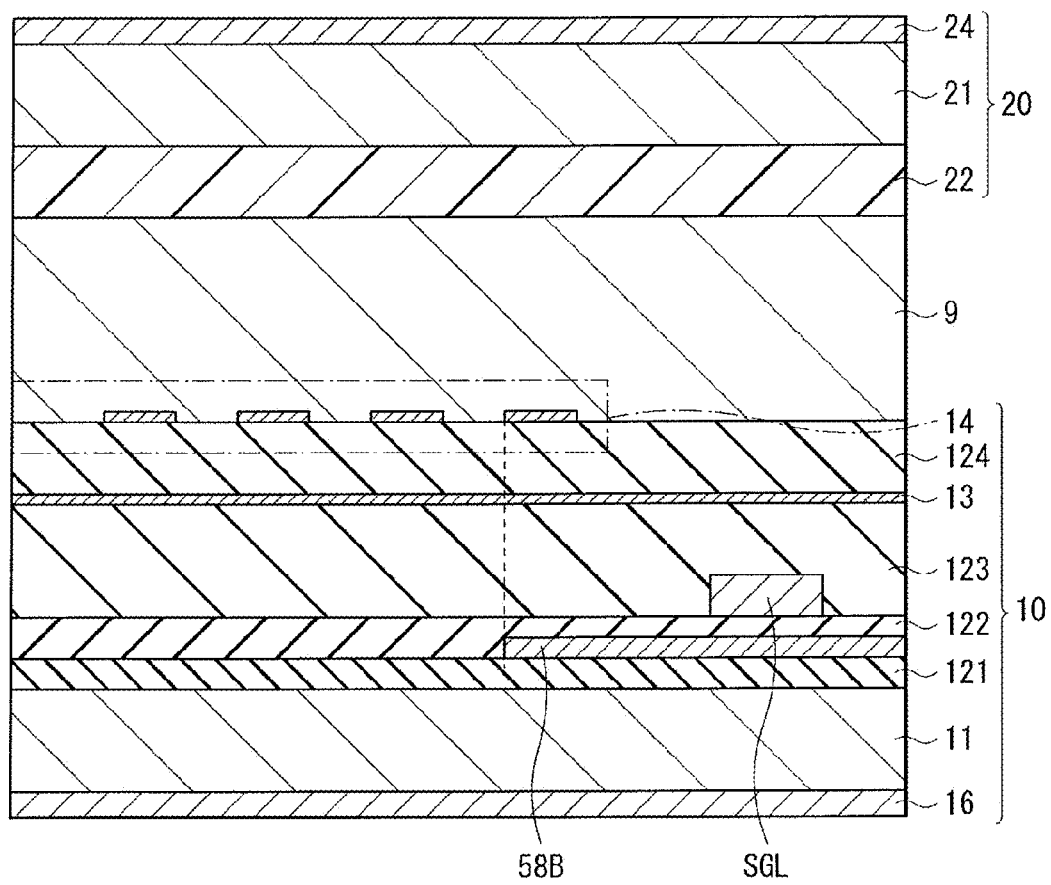
FIG. 20 is a sectional view illustrating a display section according to a modification of the fourth embodiment.

In the above-described embodiment, the light shield is configured from the black matrix in the color filter, but the invention is not limited thereto. For example, a black matrix for preventing a decline in image quality caused by a flexoelectric effect in addition to preventing color mixture may be arranged in another layer of the color filter substrate or in the array substrate, or a black matrix only for preventing a decline in image quality caused by a flexoelectric effect may be arranged separately from the black matrix for preventing color mixture. FIG. 20 illustrates a c sectional view in the case where the black matrix is arranged in the array substrate. The black matrix is arranged between the insulating film 121 and the insulating film 122, and a light shield 58B is configured from the black matrix.

b. Modification 4-2

In the above-described embodiment, the color filter is arranged in the color filter substrate 20, but the invention is not limited thereto, and, for example, the color filter may be arranged in the array substrate 10.

5. Fifth Embodiment

Next, a liquid crystal display according to a fifth embodiment will be described below. In the fifth embodiment, a liquid crystal display is configured using a display section 61 in which a dummy electrode is arranged between pixel electrodes. Other configurations are the same as those in the first embodiment (refer to FIGS. 1 and 3) or the like. Note that like components are denoted by like numerals as of the liquid crystal display according to the first embodiment and will not be further described.

In general, in accordance with the fifth embodiment, a liquid crystal display comprises a first substrate and a first pixel electrode on the first substrate, the first pixel electrode extending along first and second directions and having a plurality of first pixel electrode strips arranged along the first direction. The liquid crystal display also has a second pixel electrode on the first substrate that extends along the first and second directions, and has a plurality of second pixel electrode strips arranged along the first direction.

In this embodiment, the second pixel electrode is spaced from the first pixel electrode along the first direction. Further, the liquid crystal display preferably comprises a common electrode on the first substrate and spaced from the first and second pixel electrodes along a third direction. A dummy electrode is arranged between the first pixel electrode and the second pixel electrode.

Figure 21:
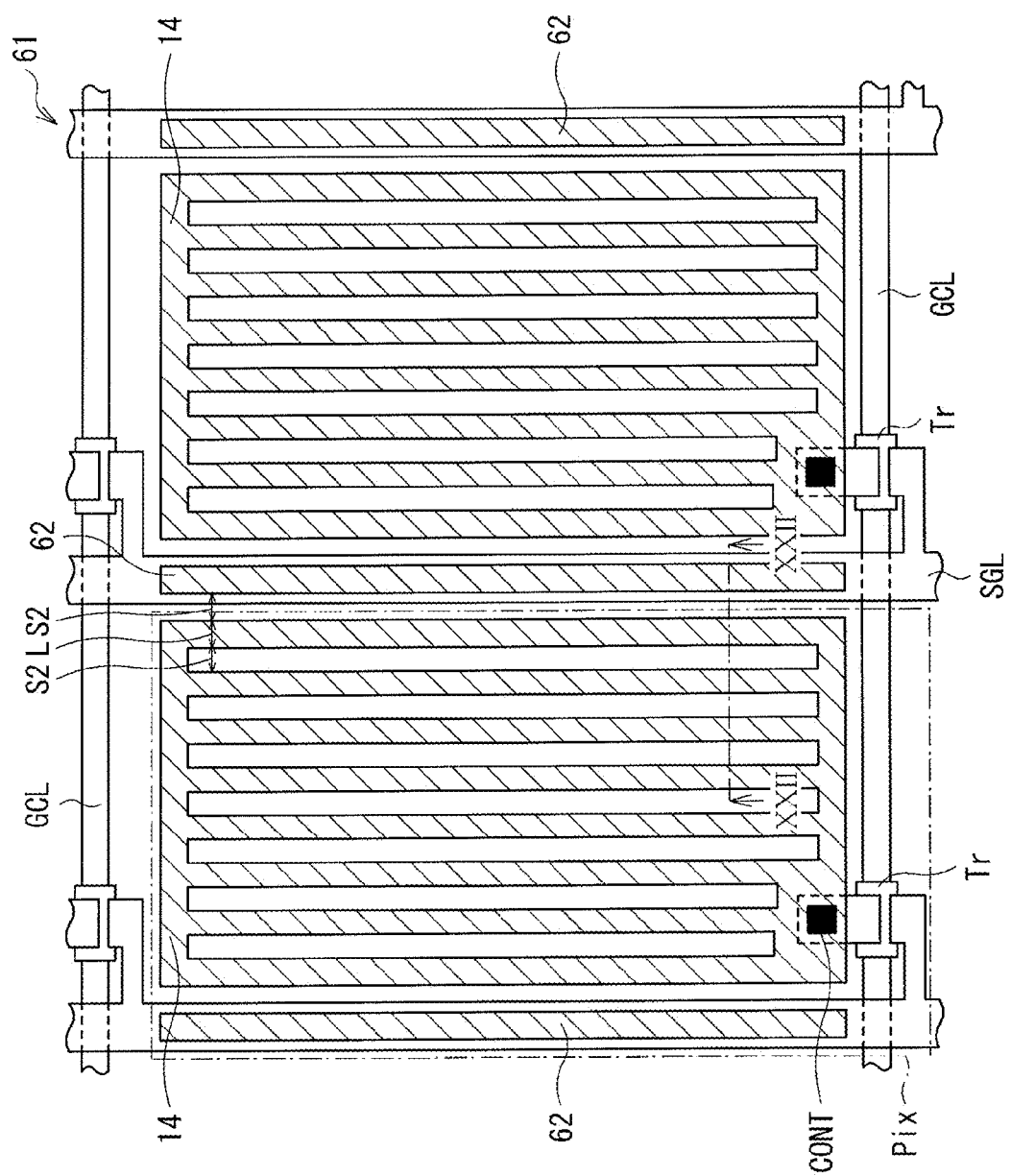
FIG. 21 is a plan view illustrating a configuration example of a display section according to a fifth embodiment.
Figure 22:
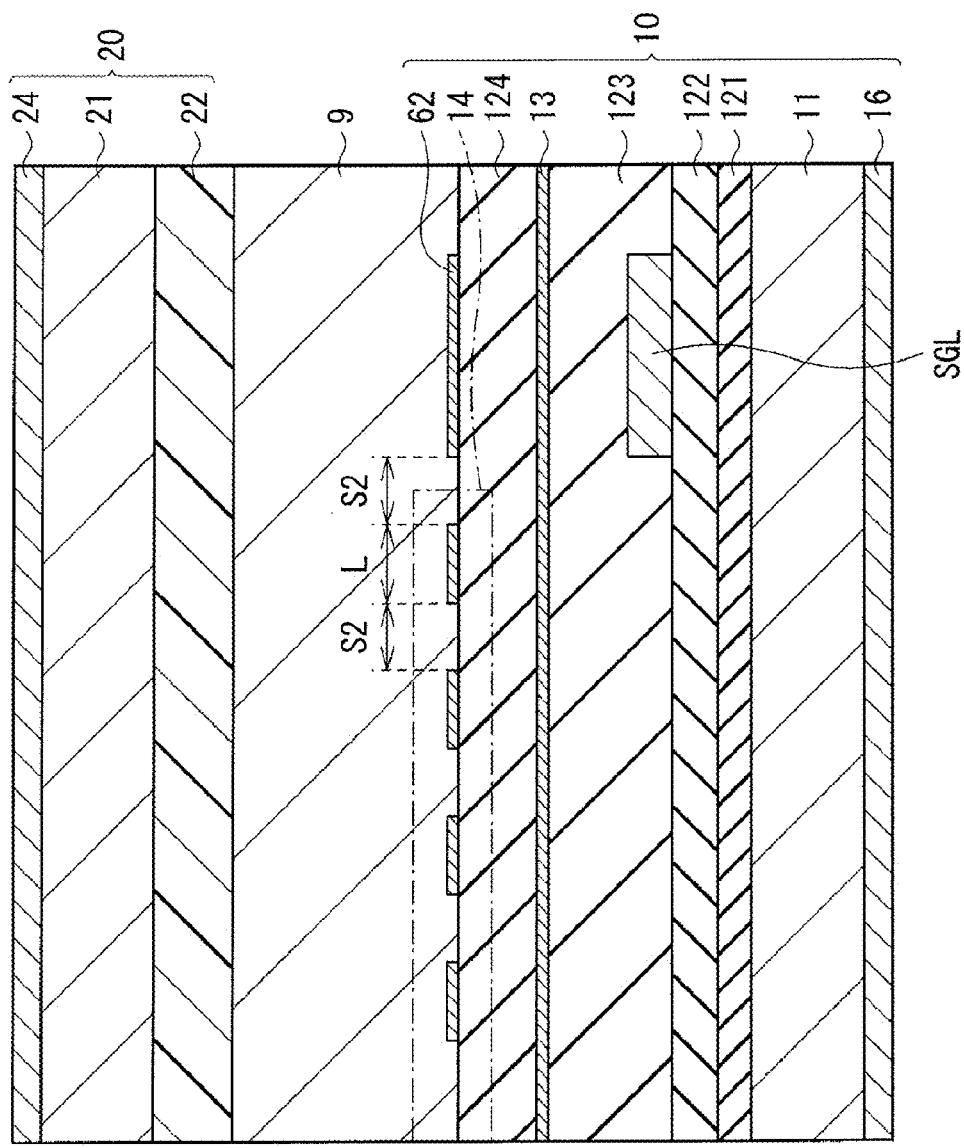
FIG. 22 is a sectional view illustrating the display section illustrated in FIG. 21.

FIG. 21 illustrates an example of the display section 61 according to the fifth embodiment, and FIG. 22 illustrates a sectional view taken along an arrow direction XXII-XXII of the display section 61 illustrated in FIG. 21. The display section 61 includes a dummy electrode 62. The dummy electrode 62 is arranged between pixel electrodes 14, spaced from each other along the first direction, of adjacent pixels Pix. As shown in FIG. 22, a distance between the dummy electrode 62 and at least an outermost strip of one of the pixel electrodes 14 along the first direction is set to be equal to an interval S2 between a plurality of strips in the pixel electrode 14. The dummy electrode 62 is in the same layer and is formed from the same material as that of each of the pixel electrodes 14. In other words, the dummy electrode 62 and each pixel electrode 14 are formed concurrently in one and the same step of the manufacturing process. In an example illustrated in FIGS. 21 and 22, the dummy electrode 62 is not electrically connected to any part of the display section 61, and is in a floating state.

As illustrated in FIG. 11, the difference in polarization of the liquid crystal between the positive and negative frames which is described in the comparative example to the first embodiment is reduced with a decrease in the electrode interval S between pixels (with an increase in the line-to-space ratio). In the display section 61 according to this embodiment, since the dummy electrode 62 is spaced from the outermost strip of the pixel electrode 14 along the first direction by an interval equal to the interval S2 between the strips in the pixel electrode 14, the above-described electrode interval S between the pixels is equivalently reduced to reduce the difference in polarization. More specifically, in the case where the dummy electrode 62 is not arranged as in the case of the display section 6R (refer to FIG. 8) according to the comparative example in FIG. 11, the difference in polarization is large as indicated by B1, but when the dummy electrode 62 is positioned from the outermost strip of the pixel electrode 14 at the interval S2, as in the case of the display section 61 according to the present embodiment (refer to FIG. 21), the difference in polarization may be reduced as indicated by B2. This means that when the dummy electrode 62 is included, a flexoelectric effect is reduced. In the display section 61, a flexoelectric effect is reduced in such a manner to reduce the difference in polarization of the liquid crystal between the positive and negative frames. Therefore, a difference in light transmittance between the positive and negative frames is reduced, and as a result, flickers may be reduced, and high image quality is achievable. Moreover, in the display section 61, the dummy electrode 62 is arranged to reduce a flexoelectric effect, so the occurrence of burn-in, which is described in the first embodiment, caused by a flexoelectric effect is preventable, and high image quality is achievable.

As described above, in this embodiment, since the dummy electrode is positioned at an outward distance, which is equal to the interval between the strips of the pixel electrode, from the outermost strip of the pixel electrode, a flexoelectric effect may be reduced. Further, as in the case where the light shield of the first embodiment or the like is included, high image quality is achievable without reducing an aperture ratio.

Moreover, in the present embodiment, since the dummy electrode and the pixel electrodes are in the same layer, and are also formed from the same material, the configuration of the display is simplified, and it is not necessary to add a manufacturing step for forming the dummy electrode. Therefore, an increase in manufacturing cost may not occur.

a. Modification 5-1

In the above-described embodiment, the dummy electrode is not electrically connected to any part of the display section, but the invention is not limited thereto. For example, the dummy electrode may be electrically connected to another part in the display section.

Figure 23:
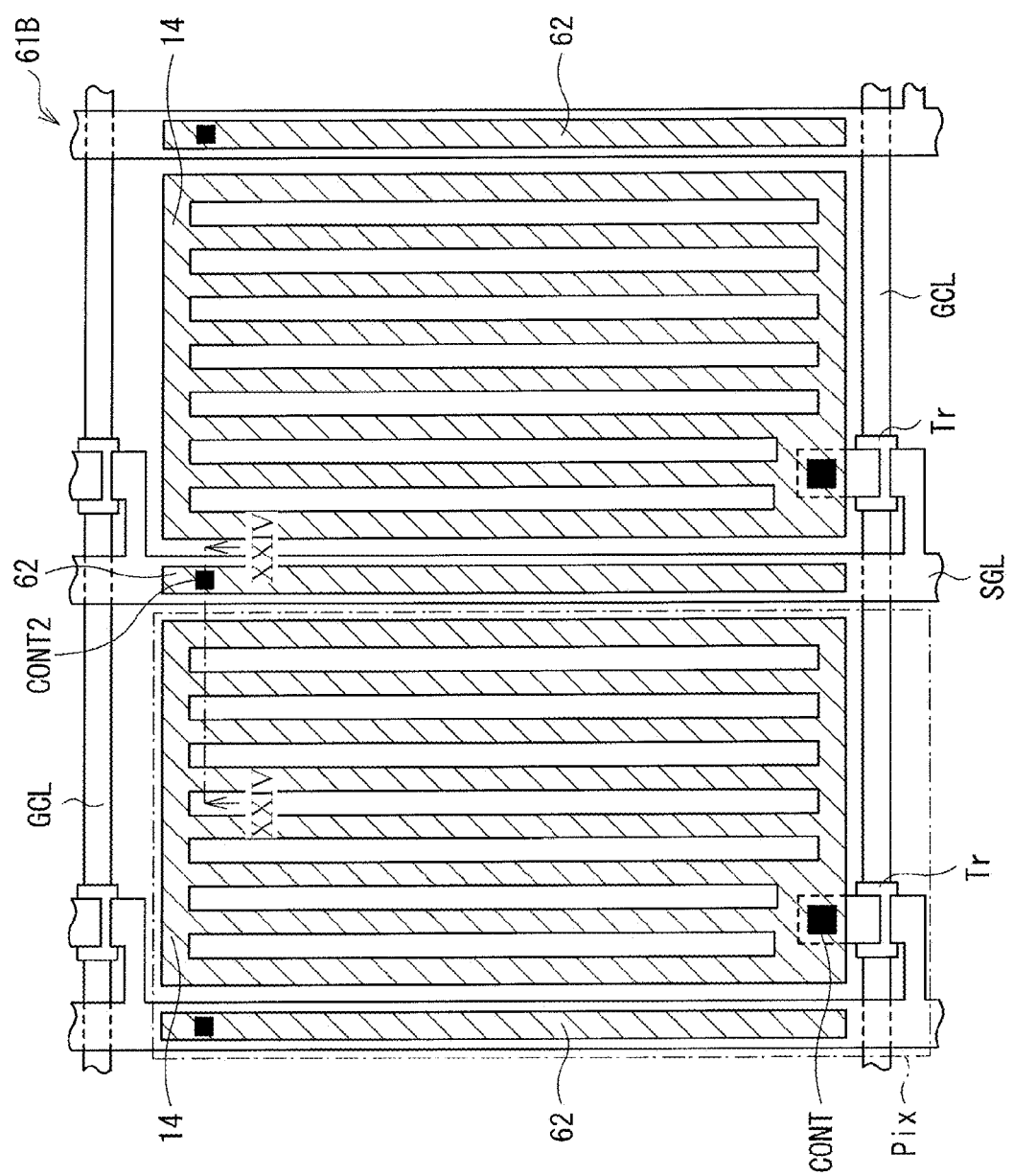
FIG. 23 is a plan view illustrating a configuration example of a display section according to a modification of the fifth embodiment.
Figure 24:
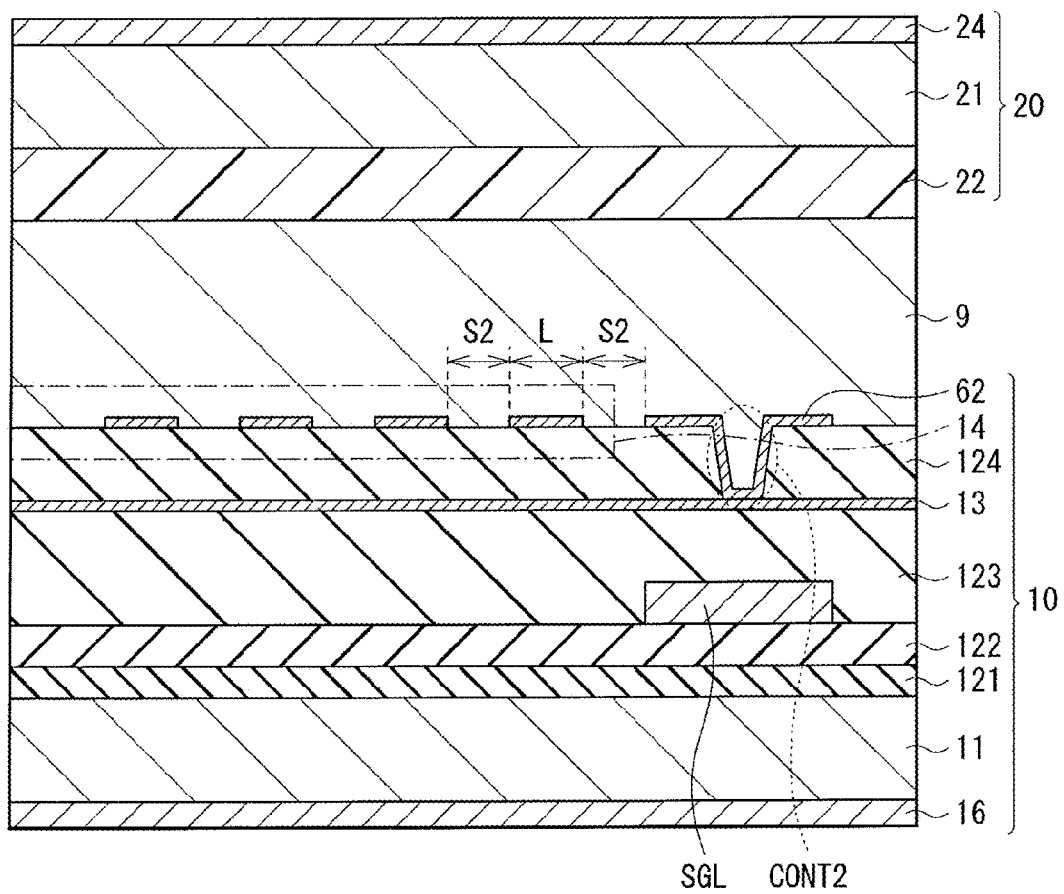
FIG. 24 is a sectional view illustrating the display section illustrated in FIG. 23.

FIG. 23 illustrates a configuration example of a display section 61B in which the dummy electrode is electrically connected to the common electrode, and FIG. 24 illustrates a sectional view taken along an arrow direction XXIV-XXIV of the display section 61B illustrated in FIG. 23. The dummy electrode 62 is electrically connected to the common electrode 13 spaced from the pixel electrode 14 long the third direction on a whole layer below the pixel electrode 14 through a contact CONT2. Thus, the common signal Vcom is supplied from the common signal driver 3 to the dummy electrode 62 through the common electrode 13 and the contact CONT2. In the display section 61B, the common signal Vcom is applied to the dummy electrode 62 in such a manner, so the potential of the dummy electrode 62 is not in a floating state, unlike the case illustrated in FIGS. 21 and 22 and is known. Therefore, an electric field around the dummy electrode 62 may be taken into consideration in a design stage so as to allow a more accurate design to further reduce a flexoelectric effect.

In FIG. 23, the dummy electrode 62 is connected to the common electrode 13 through one contact CONT2, but the invention is not limited thereto. For example, the dummy electrode 62 may be connected to the common electrode 13 through a plurality of contacts.

b. Other Modifications

In the above-described embodiment, a second interval between the outermost strip of the pixel electrode 14 and the dummy electrode 62 is equal to the interval between the plurality of strips in the pixel electrode 14. However, the invention is not limited thereto, and the second interval may be slightly different from the interval between the strips. Preferably, when the plurality of strips of pixel electrode 14 are spaced from each other along the first direction by a first interval, the second interval between at least the outermost strip of the pixel electrode 14 and the dummy electrode 62 along the first direction is effectively equal to the interval between the plurality of strips in the pixel electrode 14. Also, in this case, the difference in polarization is sufficiently reduced, compared to the difference indicated by B1 (in the case where the dummy electrode is not included), though the difference is slightly different from that indicated by B2.

In the above-described embodiment, the dummy electrode 62 is formed from the same material as that of the pixel electrode 14 but the invention is not limited thereto. For example, the dummy electrode 62 may be formed from a different material than that of the pixel electrode 14.

In the above-described embodiment, dummy electrodes are arranged between pixel electrodes of adjacent pixels of all pixels (red, blue and green); however, the invention is not limited thereto. For example, the dummy electrode may be arranged only between a green pixel and a pixel adjacent to the green pixel. The green pixel has higher transmittance than red and blue pixels, so a flexoelectric effect greatly affects image quality. Therefore, when the dummy electrodes are arranged only around the green pixels, image quality is effectively improved with use of a minimum number of dummy electrodes.

6. Sixth Embodiment

Next, a liquid crystal display according to a sixth embodiment will be described below. In the sixth embodiment, an interval between pixel electrodes of adjacent pixels is reduced. In other words, in the fifth embodiment (refer to FIG. 21), the dummy electrode is arranged between pixel electrodes of adjacent pixels to equivalently reduce the interval between the pixel electrodes. In the present embodiment, the interval between the pixel electrodes of adjacent pixels is reduced. Other configurations are the same as those in the fifth embodiment (refer to FIG. 21). Note that like components are denoted by like numerals as of the liquid crystal display according to the fifth embodiment and will not be further described.

In general, according to the sixth embodiment, a liquid crystal display comprises a first substrate and a first pixel electrode on the first substrate, the first pixel electrode extending along first and second directions and having a plurality of first pixel electrode strips arranged along the first direction, where the plurality of first pixel electrode strips are distanced from each other along the first direction by a first interval. The liquid crystal display also comprises a second pixel electrode adjacent to the first pixel electrode, the second pixel electrode extending along the first and second directions and having a plurality of second pixel electrode strips arranged along the first direction, where the plurality of second pixel electrode strips distanced from each other along the first direction by the first interval.

Further, the liquid crystal display preferably comprises a common electrode on the first substrate and spaced from the first and second pixel electrodes in a third direction. According to this embodiment, the first pixel electrode and the second pixel electrode are spaced from each other by a second interval that is effectively equal to the first interval.

In a related embodiment, a liquid crystal display comprises a first pixel electrode extending along first and second directions and a second pixel electrode spaced from the first pixel electrode along the first direction by an interval. A common electrode may be spaced from the first and second pixel electrodes along a third direction. In the related embodiment, the interval between the first pixel electrode and the second pixel electrode is such that a flexoelectric effect in the liquid crystal display is reduced.

Figure 25:
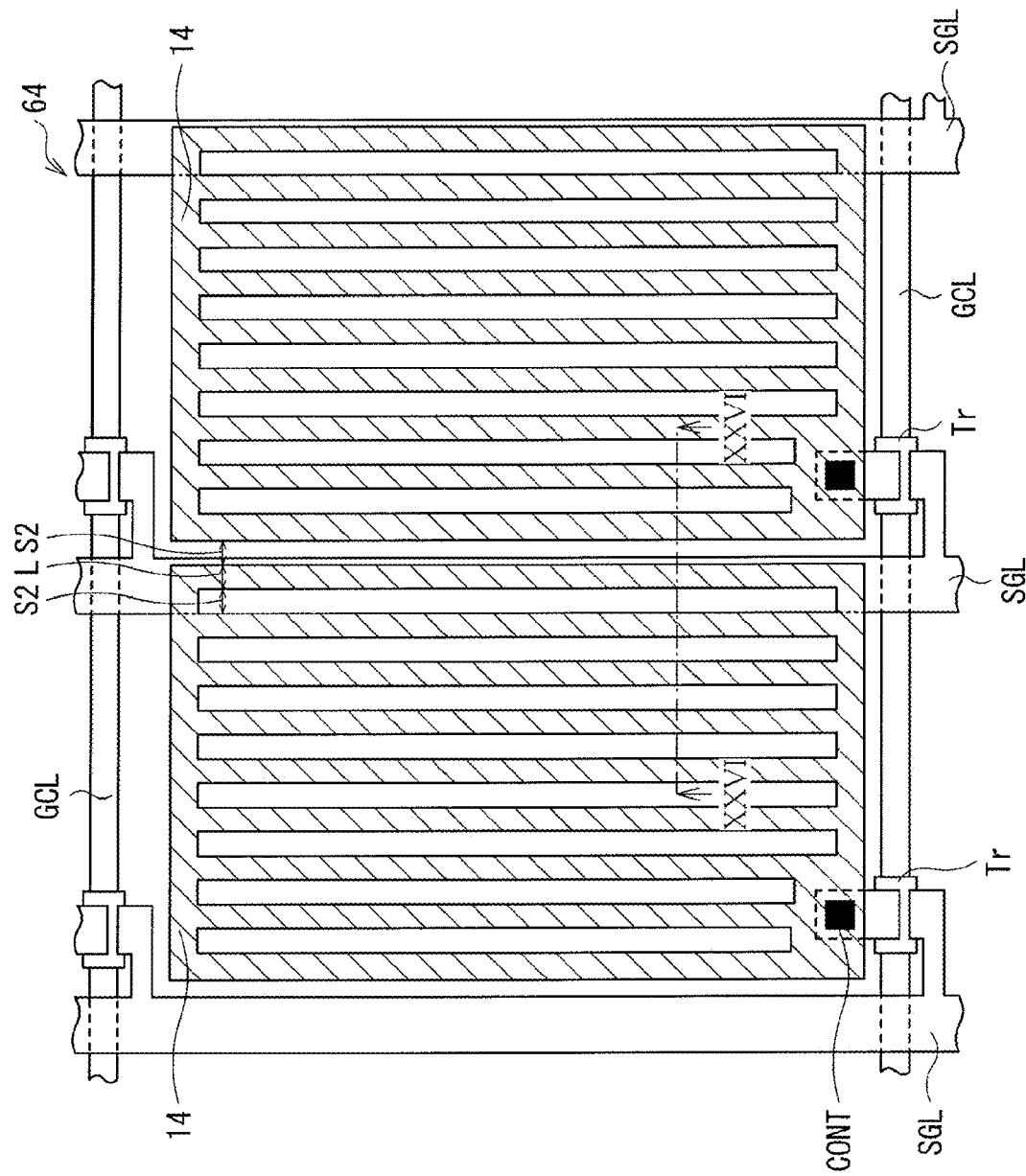
FIG. 25 is a plan view illustrating a configuration example of a display section according to a sixth embodiment.
Figure 26:
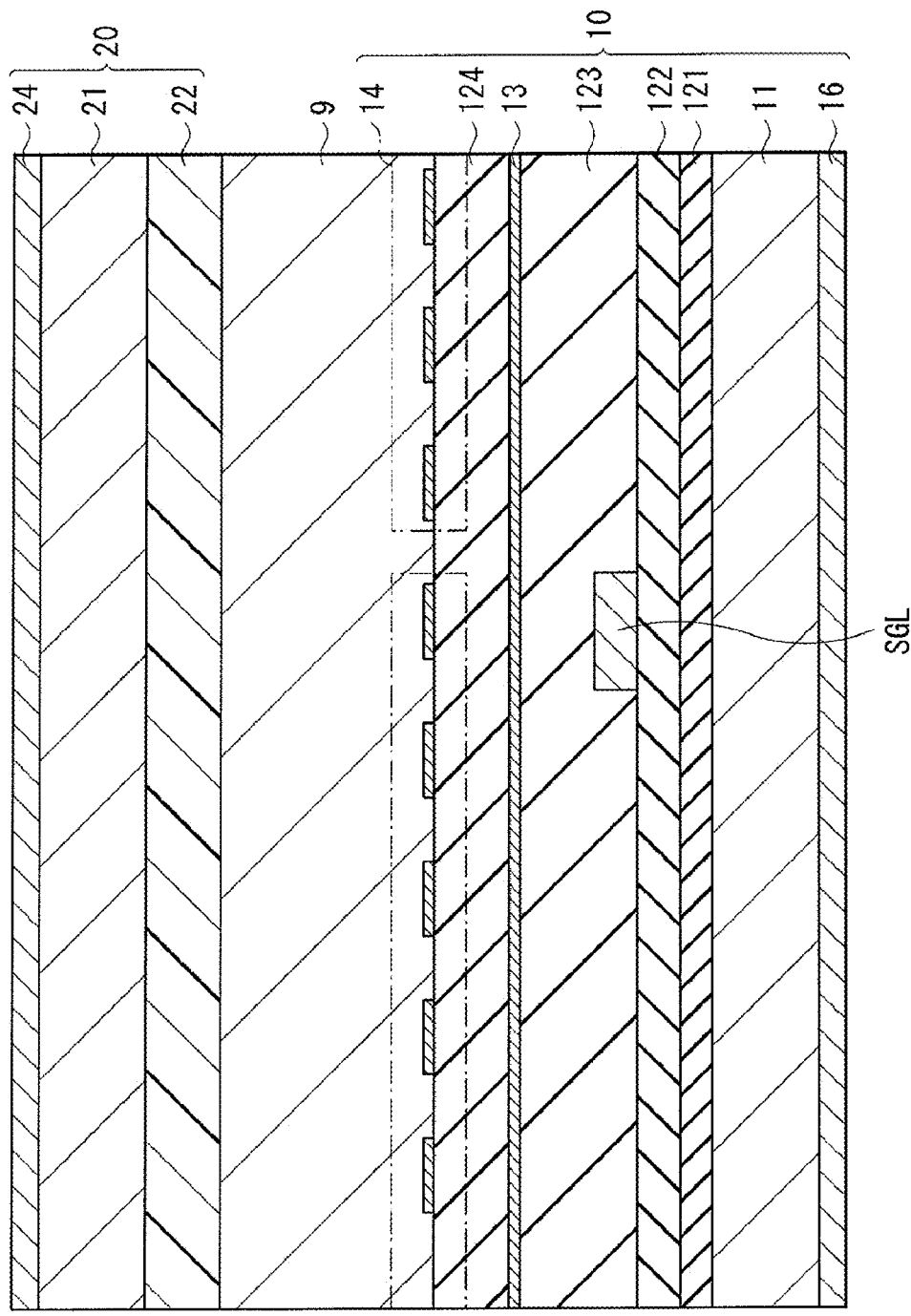
FIG. 26 is a sectional view illustrating the display section illustrated in FIG. 25.

FIG. 25 illustrates an example of a display section 64 according to the sixth embodiment, and FIG. 26 illustrates a sectional view taken along an arrow direction XXVI-XXVI of the display section 64 illustrated in FIG. 25. In the display section 64, an interval between the pixel electrodes 14 of adjacent pixels is equal to the interval S2 between a plurality of strips in the pixel electrode 14.

In the display section 64, the interval between the pixel electrodes 14 (spaced from each other along the first direction, as shown in FIG. 25) of adjacent pixels is reduced so as to reduce the above-described electrode interval S between the pixels, thereby reducing the difference in polarization of the liquid crystal between the positive and negative frames. Therefore, as in the case of the fifth embodiment, the difference in light transmittance between the positive and negative frames is reduced, and as a result, flickers may be reduced, and high image quality is achievable. Moreover, in the display section 64, as in the case of the fifth embodiment, the occurrence of burn-in caused by a flexoelectric effect is preventable, so high image quality is achievable.

As described above, in this embodiment, the interval between the pixel electrodes 14 of adjacent pixels is reduced. As a result, a flexoelectric effect may be reduced As in the case where the light shield of the first embodiment or the like is included, high image quality is achievable without reducing an aperture ratio.

Moreover, in the embodiment, any additional member for reducing a flexoelectric effect is not necessary, so the configuration is simplified, and an increase in manufacturing cost is preventable.

a. Modification 6-1

Figure 27:
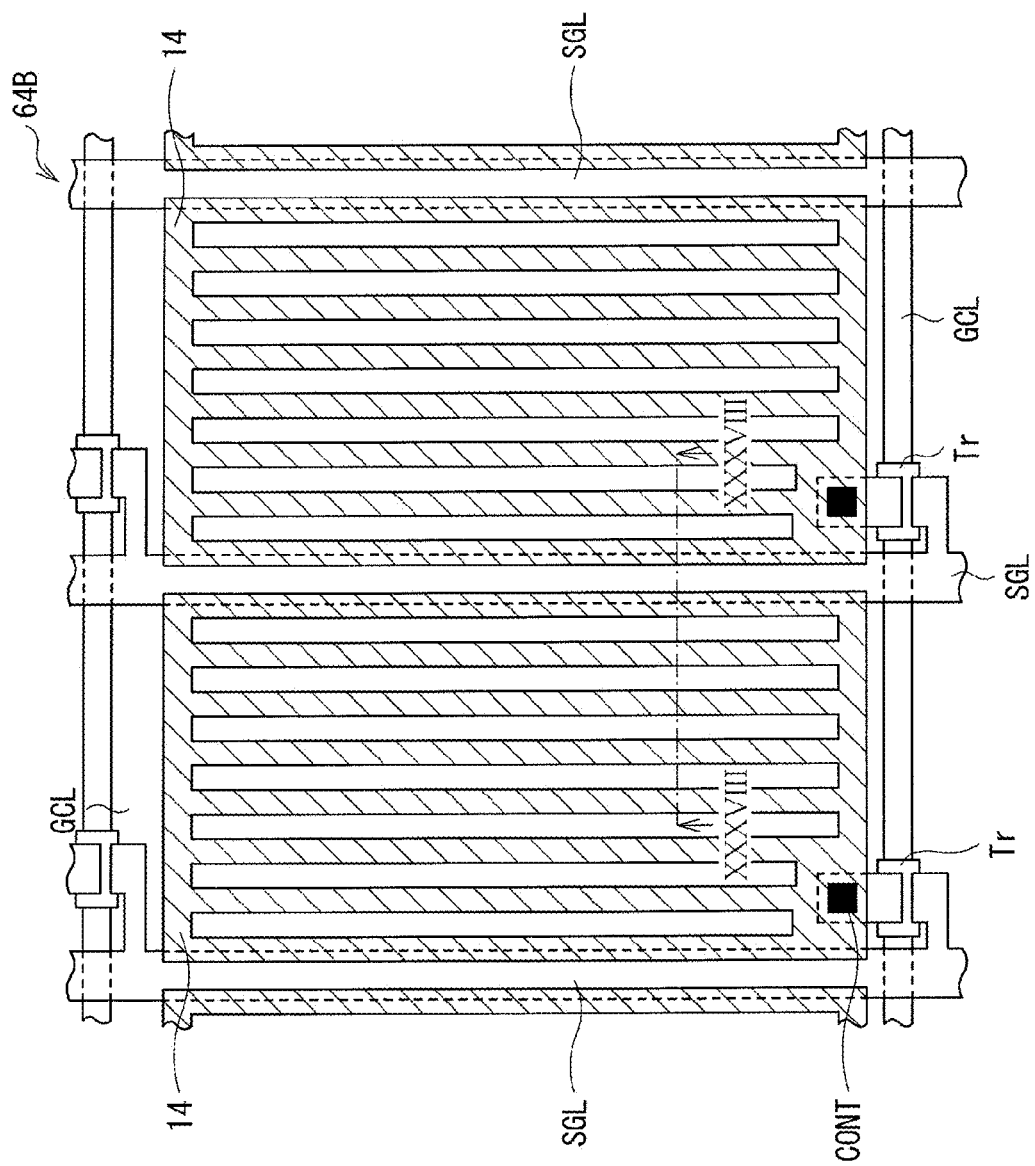
FIG. 27 is a plan view illustrating a configuration example of a display section according to a modification of the sixth embodiment.
Figure 28:
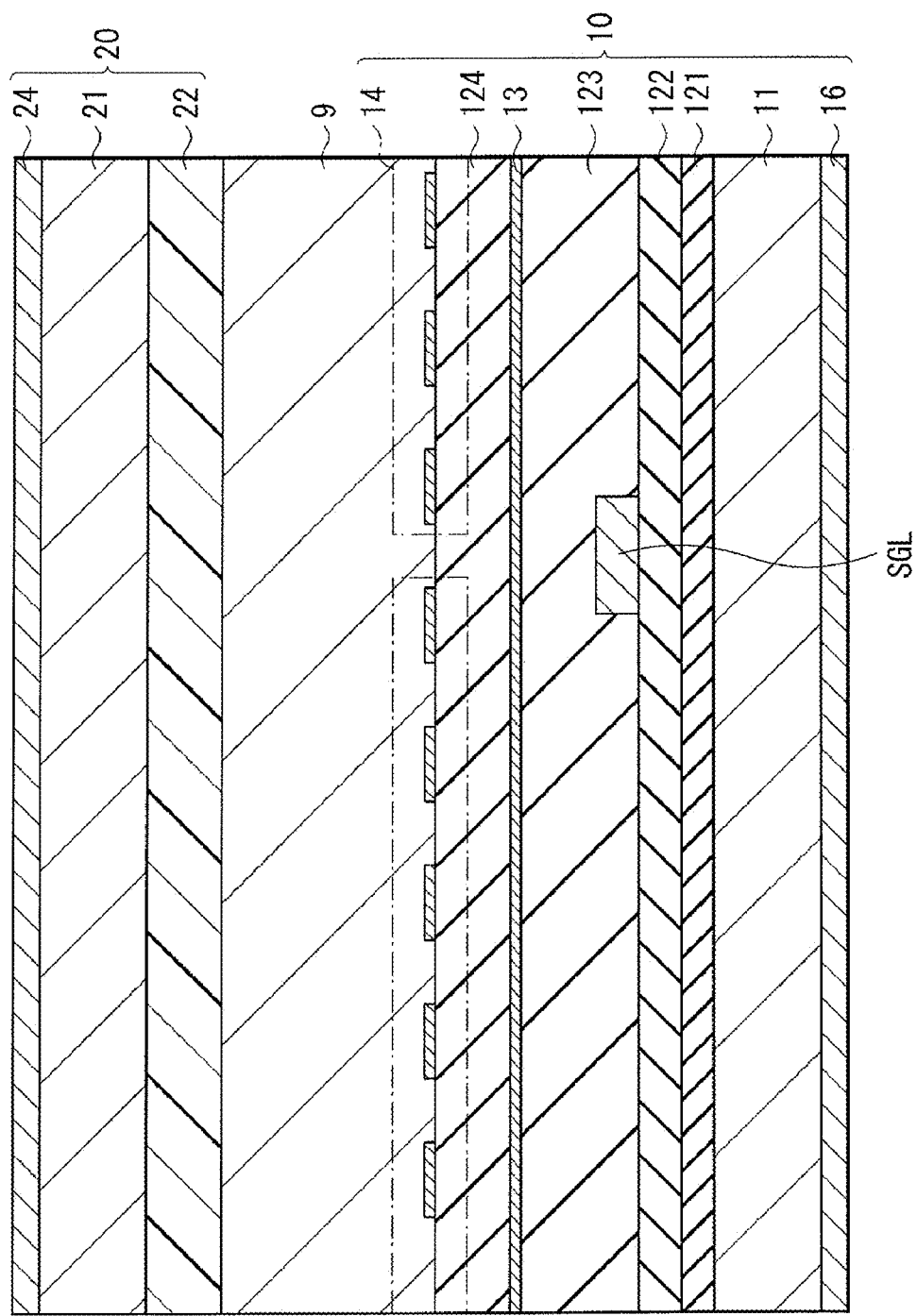
FIG. 28 is a sectional view illustrating the display section illustrated in FIG. 27.

In the above-described embodiment, as illustrated in FIG. 25, the pixel electrodes 14 are arranged so that an interval between the pixel electrodes 14 of adjacent pixels is shifted from the pixel signal line SGL. However, the invention is not limited thereto. For example, as illustrated in FIGS. 27 and 28, the interval between adjacent pixel electrodes 14 may be arranged so as to overlap the pixel signal line SGL. Even in the case where an error in transmittance of the liquid crystal in the interval between adjacent pixel electrodes 14 occurs due to an electric field formed by the pixel signal Vpix applied to each pixel electrode 14, the pixel signal line SGL functions as a light shield; therefore, the influence of the error on image quality is allowed to be minimized.

b. Other Modifications

In the above-described embodiment, the interval between the pixel electrodes 14 of adjacent pixels is equal to the interval between the plurality of strips in the pixel electrode 14; However, the invention is not limited thereto, and the interval may be slightly different from the interval between the strips. Preferably, the interval between adjacent pixel electrodes 14 is effectively equal to the interval between the plurality of strips of the pixel electrode 14. Therefore, also in this case, the difference in polarization is sufficiently reduced, compared to the difference indicated by B1 in FIG. 11 (in the case where the interval between the pixel electrodes 14 of adjacent pixels is larger that the interval of the present embodiment), though the difference is slightly different from that indicated by B2 in FIG. 11.

In the above-described embodiment, the interval between pixel electrodes of adjacent pixels of all pixels (red, blue and green) is reduced, but the invention is not limited thereto. For example, only a distance between a pixel electrode of a green pixel and a pixel electrode of a pixel adjacent to the green pixel may be reduced. The green pixel has higher transmittance than red and blue pixels, so a flexoelectric effect greatly affects image quality. Therefore, when only the distance between pixel electrodes of the green pixel and the pixel adjacent to the green pixel is reduced, image quality may be effectively improved.

7. Application Examples

Next, referring to FIG. 29 to FIGS. 33A to 33G, application examples of the liquid crystal displays described in the above-described embodiments and the above-described modifications will be described. The liquid crystal displays according to the above-described embodiments (and the like) are applicable to electronic units in any fields, such as televisions, digital cameras, notebook personal computers, portable terminal devices such as cellular phones, and video cameras. In other words, the liquid crystal displays according to the above-described embodiments are applicable to electronic units, in any fields, displaying a picture signal inputted from outside or a picture signal produced inside as an image or a picture.

a. Application Example 1

Figure 29:
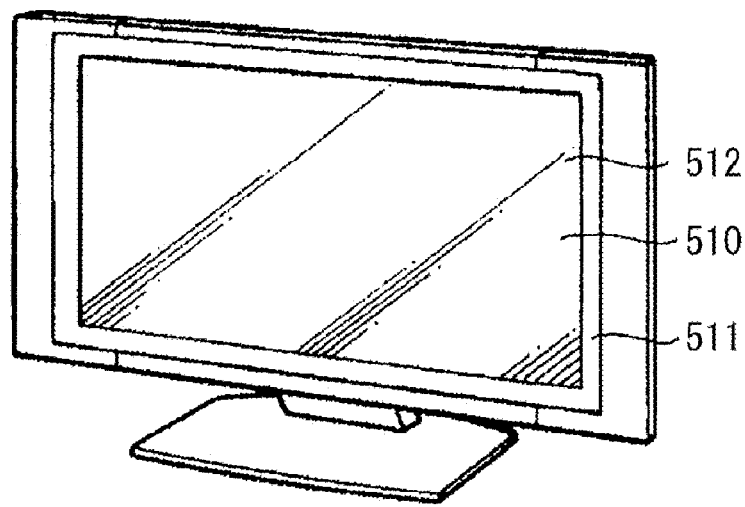
FIG. 29 is an external perspective view of Application Example 1 of a liquid crystal display according to respective embodiments.

FIG. 29 illustrates a television to which the liquid crystal display according to the above-described respective embodiments is applied. The television has, for example, a picture display screen section 510 including a front panel 511 and a filter glass 512. The picture display screen section 510 comprises the liquid crystal display according to the above-described respective embodiments.

b. Application Example 2

Figure 30A:
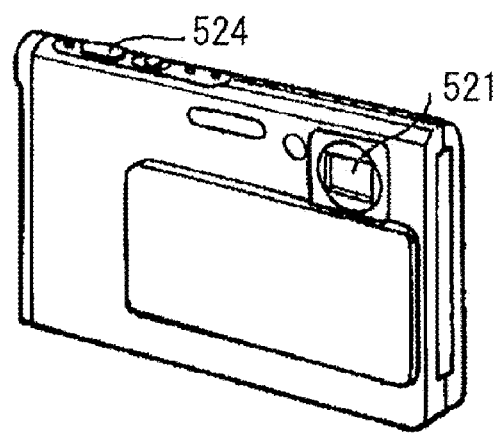
FIGS. 30A and 30B are external perspective views of Application Example 2.
Figure 30B:
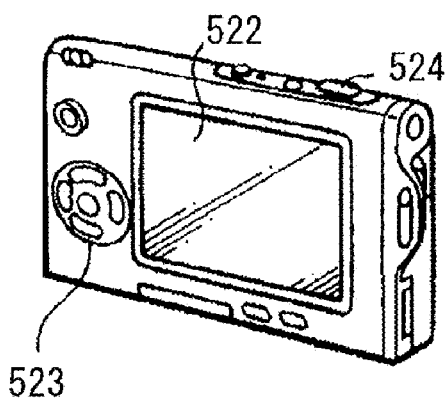

FIGS. 30A and 30B illustrate a digital camera to which the liquid crystal display according to the above-described respective embodiments is applied. The digital camera has, for example, a light-emitting section for a flash 521, a display section 522, a menu switch 523, and a shutter button 524. The display section 522 comprises the liquid crystal display according to the above-described respective embodiments.

c. Application Example 3

Figure 31:
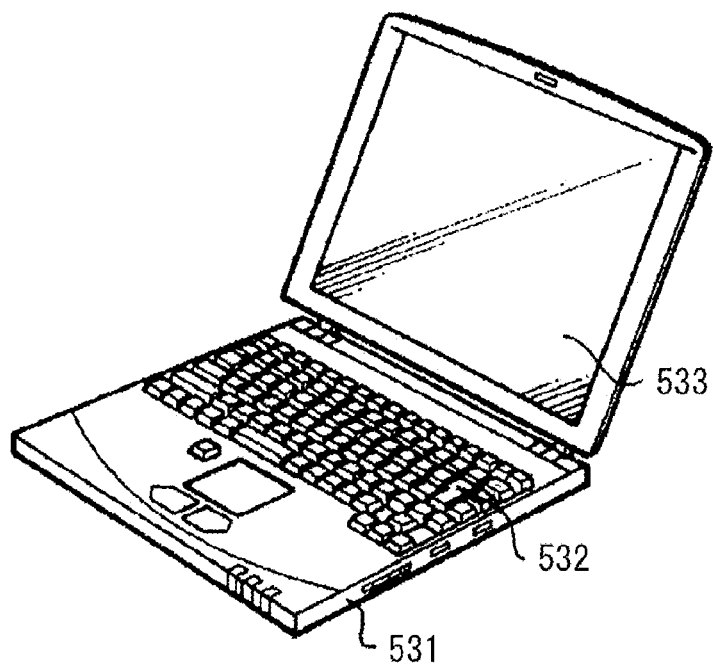
FIG. 31 is an external perspective view of Application Example 3.

FIG. 31 illustrates a notebook personal computer to which the liquid crystal display according to the above-described respective embodiments is applied. The notebook personal computer has, for example, a main body 531, a keyboard 532 for operation of inputting characters and the like, and a display section 533 for displaying an image. The display section 533 comprises f the liquid crystal display according to the above-described respective embodiments and the like.

d. Application Example 4

Figure 32:
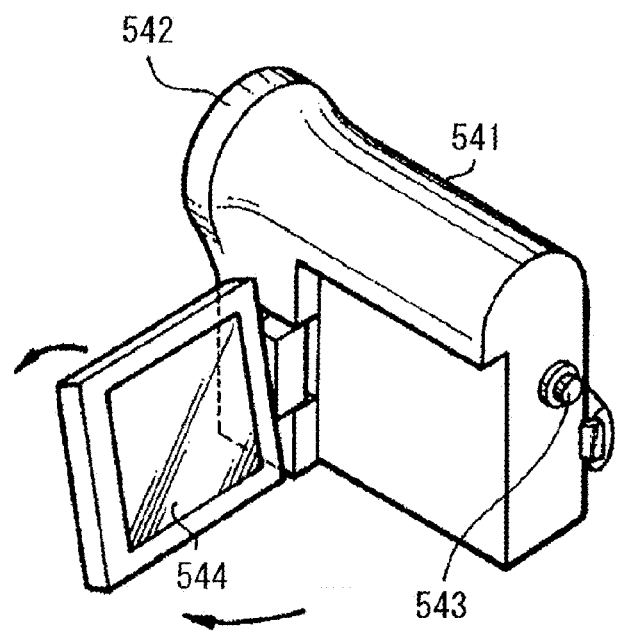
FIG. 32 is an external perspective view of Application Example 4.
Figure 34A:
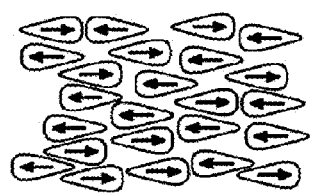
FIGS. 34A and 34B are views for describing a flexoelectric effect.
Figure 34B:
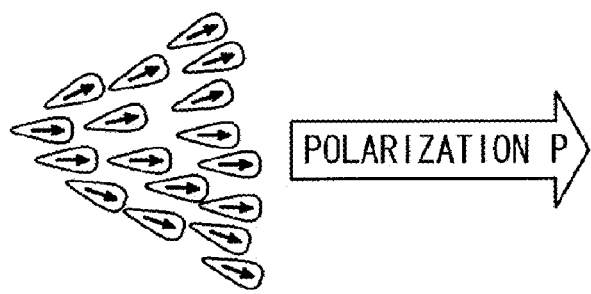
Figure 35A:
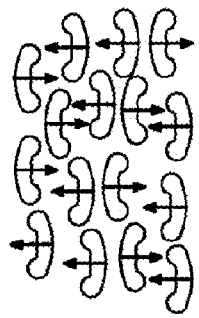
FIGS. 35A and 35B are other views for describing a flexoelectric effect.
Figure 35B:
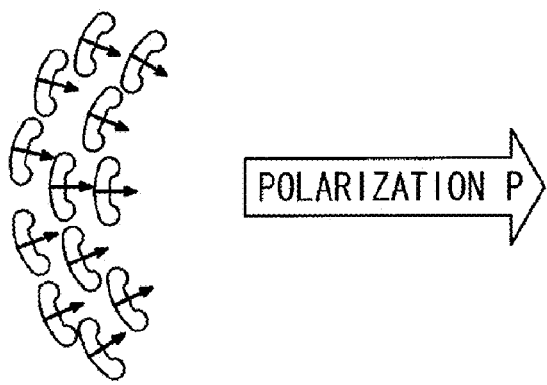

FIG. 32 illustrates a video camera to which the liquid crystal display according to the above-described respective embodiments is applied. The video camera has, for example, a main body 541, a lens for shooting an object 542 arranged on a front surface of the main body 541, a shooting start/stop switch 543, and a display section 544. The display section 544 comprises the liquid crystal display according to the above-described respective embodiments.

e. Application Example 5

FIGS. 33A to 33G illustrate a cellular phone to which the liquid crystal display according to the above-described respective embodiments is applied. The cellular phone is formed by connecting, for example, a top-side enclosure 710 and a bottom-side enclosure 720 to each other by a connection section (hinge section) 730. The cellular phone has a display 740, a sub-display 750, a picture light 760, and a camera 770. The display 740 or the sub-display 750 comprises the liquid crystal display according to the above-described respective embodiments and the like.

Although various embodiments have been described above, the invention is not limited thereto, and modifications are possible.

For example, in the above-described respective embodiments, a liquid crystal display performs a frame reverse drive, but, the invention is not limited thereto. For example, the liquid crystal display may perform a line reverse drive in which the polarity of a potential difference between the voltage of a pixel electrode and the voltage of a common electrode is reversed from line to line, or a dot reverse drive in which the polarity of the potential difference is reversed from dot to dot.

Moreover, for example, in the first to fourth embodiments, the light shields are provided for all pixels (red, blue and green). However, the invention is not limited thereto. For example, the light shield may be provided for only each green pixel. The green pixel has higher transmittance than the red and blue pixels, so a flexoelectric effect greatly affects image quality. Therefore, when the light shield is provided only for each green pixel, a decline in an aperture ratio caused by including the light shield may be minimized, and image quality is allowed to be effectively improved.

Further, for example, in the first to fourth embodiments, the light shield is formed in the same layer where the scanning signal line GCL, the pixel signal line SGL or the color filter 22 is formed. However, the invention is not limited thereto, and the light shield may be formed in another layer, or a dedicated layer for the light shield may be additionally formed. Also in this case, when the light shield is included, flickers and burn-in are allowed to be reduced, and high image quality is achievable.

Moreover, for example, in the first to fourth embodiments, the light shield is included in an FFS mode display section. However, the invention is not limited thereto, and the light shield may be included, for example, in an IPS mode display section. Also in this case, when the light shield is included in the IPS mode display section, flickers and burn-in may be reduced, and high image quality is achievable.

It should be understood by those skilled in the art that various modifications, combinations, sub-combinations and alterations may occur depending on design requirements and other factors insofar as they are within the scope of the appended claims or the equivalents thereof.

What is claimed is:

1. A liquid crystal display comprising:
   a first substrate;
   a first pixel electrode on the first substrate, the first pixel electrode extending along first and second directions and having a plurality of first pixel electrode strips arranged along a first direction;
   a common electrode on the first substrate and spaced from the pixel electrode along a third direction; and
   a light shield spaced from the pixel electrode and the common electrode, the light shield extending along the second direction and positioned to overlap at least part of an outermost strip of the first pixel electrode along the first direction.

2. The liquid crystal display of claim 1, wherein each of the plurality of first pixel electrode strips extends along the second direction.

3. The liquid crystal display of claim 1, further comprising a scanning signal line, wherein the light shield and the scanning signal line are formed from the same material.

4. The liquid crystal display of claim 3, wherein the light shield the scanning line are in the same layer.

5. The liquid crystal display of claim 1, wherein the light shield is a pixel signal line.

6. The liquid crystal display of claim 1 further comprising a second substrate including a color filter, wherein the color filter includes the light shield.

7. The liquid crystal display of claim 1, wherein the light shield is configured from a black matrix.

8. The liquid crystal display of claim 1, wherein the light shield is formed in the first substrate.

9. The liquid crystal display of claim 2, wherein the light shield overlaps at least a central portion of the outermost strip along the first direction.

10. The liquid crystal display of claim 1, further comprising a second pixel electrode on the first substrate and spaced from the first pixel electrode along the first direction, the second pixel electrode extending along the first and second directions and having a plurality of second pixel electrode strips arranged along the first direction, wherein the light shield overlaps at least part of an outermost strip of the second pixel electrode.

11. The liquid crystal display of claim 10, further comprising a scanning signal line in a layer spaced from the first pixel electrode along the third direction, wherein the light shield and the scanning signal line are formed from the same material.

* * * * *